US008648696B2

(12) United States Patent
Yoshida

(10) Patent No.: US 8,648,696 B2
(45) Date of Patent: Feb. 11, 2014

(54) IMAGE PROCESSING DEVICE, USER AUTHENTICATION METHOD AND PROGRAM

(75) Inventor: Eiichi Yoshida, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 461 days.

(21) Appl. No.: 12/628,279

(22) Filed: Dec. 1, 2009

(65) Prior Publication Data

US 2010/0134244 A1 Jun. 3, 2010

(30) Foreign Application Priority Data

Dec. 2, 2008 (JP) ................................ 2008-307772

(51) Int. Cl.
G05B 19/04 (2006.01)
(52) U.S. Cl.
USPC ............. 340/5.81; 340/5.8; 341/22; 713/168; 399/81
(58) Field of Classification Search
USPC ......................................... 340/5.81; 434/229
See application file for complete search history.

(56) References Cited

U.S. PATENT DOCUMENTS

| 5,539,530 A * | 7/1996 | Reifman et al. ............... 358/402 |
| 6,912,126 B2 * | 6/2005 | Rudd et al. ................. 361/679.4 |
| 2007/0061573 A1 | 3/2007 | Dokuni et al. |
| 2008/0092087 A1 * | 4/2008 | Brown et al. ................. 715/863 |

FOREIGN PATENT DOCUMENTS

| JP | 03-001991 | 1/1991 |
| JP | 2002-278394 A | 9/2002 |
| JP | 2005-149237 | 6/2005 |
| JP | 2005-190164 | 7/2005 |
| JP | 2005-266699 A | 9/2005 |
| JP | 2005-267201 A | 9/2005 |
| JP | 2006-344128 A | 12/2006 |
| JP | 2007-079684 | 3/2007 |
| JP | 2007-334637 | 12/2007 |

OTHER PUBLICATIONS

Takashi Shimizu, "A Study of Operator Management in Network Operation" IEICE Technical Report, vol. 103, No. 442, Published in Japan, by The Institute of Electronics, Information and Communication Engineers on Nov. 13, 2003, pp. 101,(With English Translation pp. 1-3).
Office Action dated Oct. 5, 2010, issued in the corresponding Japanese Patent Application No. 2008-307772, and an English Translation thereof.

* cited by examiner

Primary Examiner — Daniel Wu
Assistant Examiner — Frederick Ott
(74) Attorney, Agent, or Firm — Buchanan Ingersoll & Rooney PC

(57) ABSTRACT

An image processing device includes an operation panel on which a plurality of operation keys is arranged, and a storage part that stores key information allocated to a predetermined operation key of a plurality of operation keys, and with which an user authentication information for authenticating a user authorized to use a function corresponding to the predetermined operation key and an authentication activation information in which conditions for user authentication to be executed when the predetermined operation key is operated are defined are associated. An authentication part reads the user authentication information and the authentication activation information based on the key information when the predetermined operation key is operated, and executes user authentication based on the user authentication information if conditions defined in the authentication activation information are met. A key operation enabling part enables a key operation of the predetermined operation key when user authentication results in success.

16 Claims, 21 Drawing Sheets

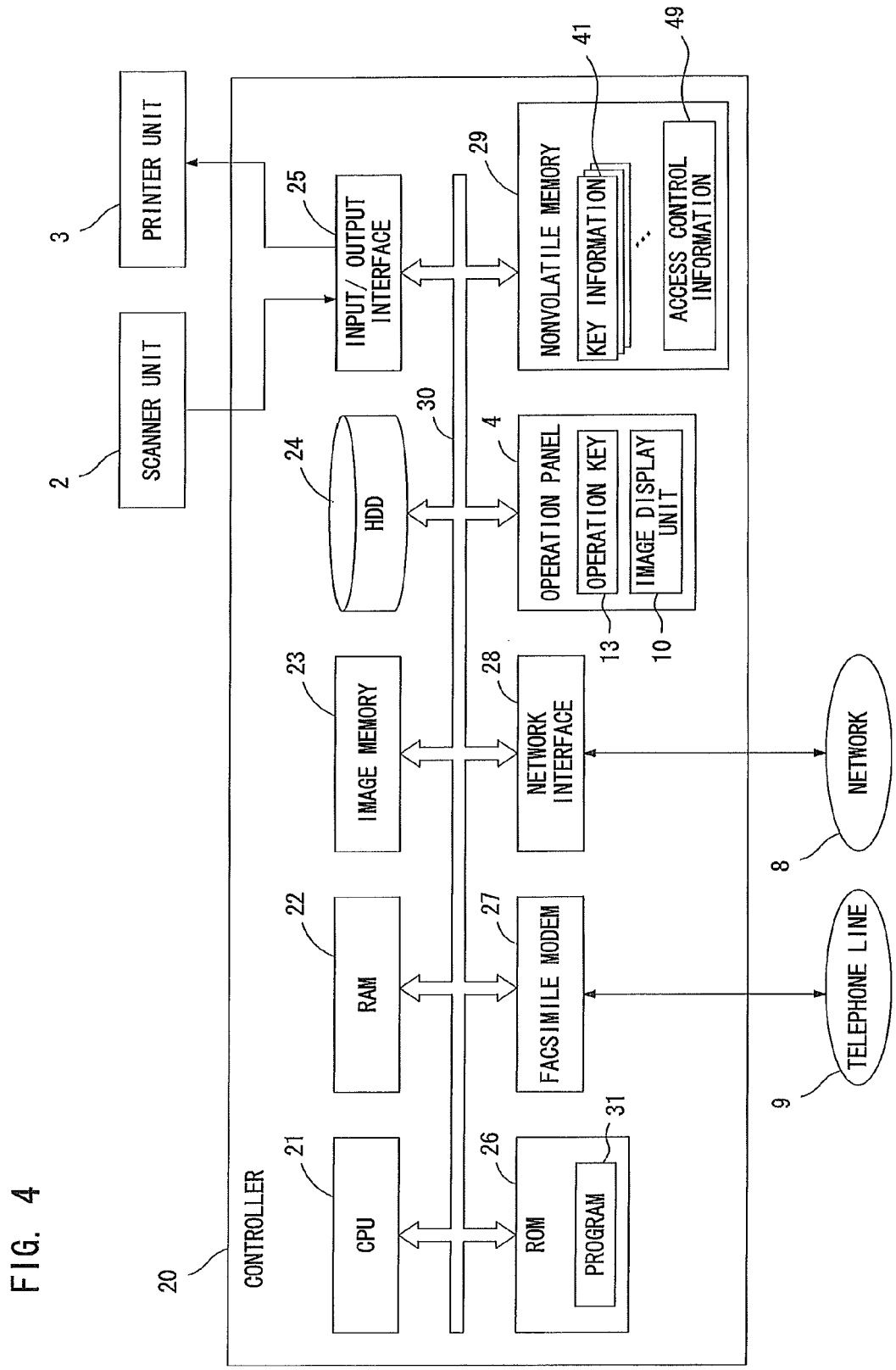

AUTHENTICATION ACTIVATION INFORMATION 43

AUTHENTICATION ACTIVATION INFORMATION 43

AUTHENTICATION ACTIVATION INFORMATION 43

AUTHENTICATION ACTIVATION INFORMATION 43

AUTHENTICATION ACTIVATION INFORMATION 43

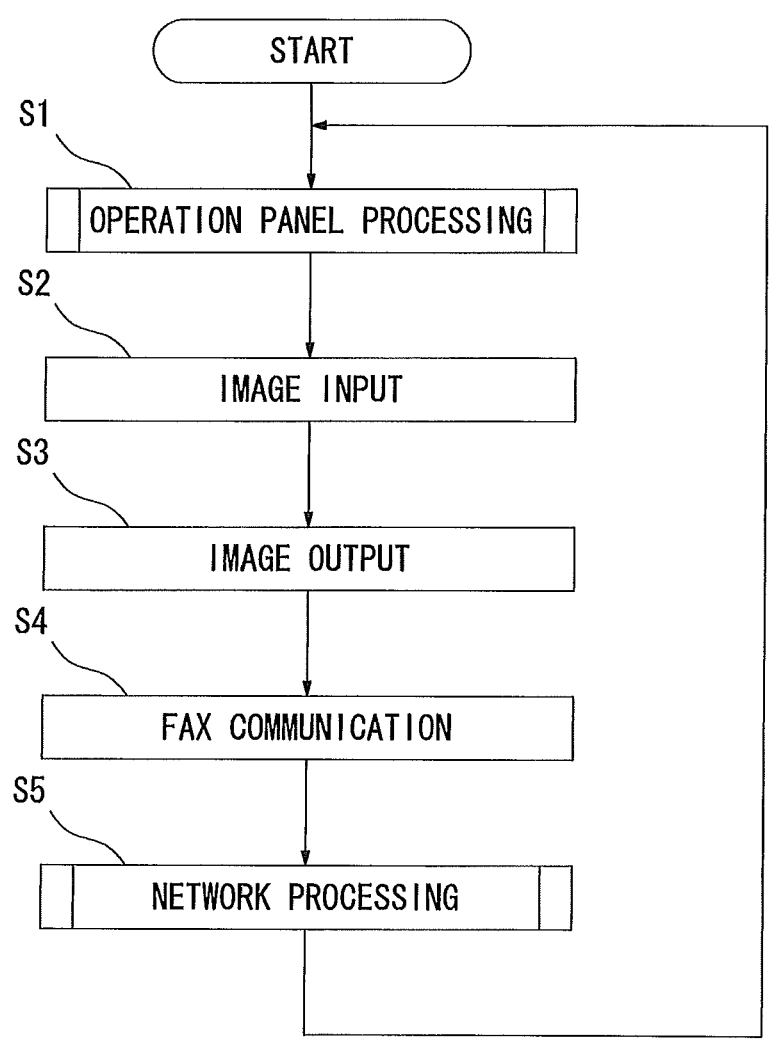

IMAGE PROCESSING DEVICE, USER AUTHENTICATION METHOD AND PROGRAM

This application is based on the application No. 2008-307772 filed in Japan, the contents of which are hereby incorporated by reference.

BACKGROUND OF THE INVENTION

1. Field of the Invention

The present invention relates to an image processing device having multiple functions, especially the one comprising an user authentication function for limiting functions for which each user is authorized by users, and relates to an user authentication method and program thereof.

2. Description of the Background Art

Image processing devices called as complex devices or MFPs (multifunction peripherals) have several functions such as a copier function, a scanner function, a FAX function and a printer function. In recent years, such image processing devices are capable of reading a color document and making color copies of it. However color copying is more costly than black copying (black-and-white copying). Therefore there is a request to restrict users who are authorized to use color copy function.

According to a conventional image processing device, available functions for which each user who uses the image processing device is authorized are registered in advance, and when each user uses the image processing device, such as an user name and a password is entered through an operation panel, thereby executing user authentication process in the image processing device. This technique is disclosed, for example in Japanese patent application laid-open No. 2006-344128. According to the technique, if user authentication results in success, the image processing device enters a logged-in mode which the user identified by authentication is logging in. The image processing device enables functions for which the user is authorized in advance. If color copy is registered in advance as an available function for which the user is authorized, he or she is allowed to use color copy function.

FIGS. 20A, 20B, and 20C show an exemplary operation sequence performed on an operation panel 100 by a user when the user uses color copy function in an image processing device conventionally employed, for example. The operation panel 100 has an image display unit 110 arranges a touch panel sensor on its surface, and an operation keys (hard keys) 112 arranged around the image display unit 110. When no user is logged into the image processing device, the image display unit 110 shows an initial screen as shown in FIG. 20A. The initial screen is a screen prompting users to log in. The user who uses the image processing device operates an operation key (soft key) 124 showing "user name" and an operation key 125 showing "password" to enter a user name and a password. The user then operates an operation key 123 for log-in and log-out, thereby executing user authentication process in the image processing device.

When user authentication results in success, a display screen on the display unit 110 shows a copy mode operation screen as shown in FIG. 20B. If the user logging into the image processing device is authorized to perform color copy, both of an operation key 121 for setting color copy and an operation key 122 for setting black copy as items of selecting color mode are shown to be selectable on the copy mode operation screen. The operation key 122 for black copy is selected in the default state. When the user logging in would like to perform color copy, the user operates the operation key 121 for setting color copy. The display screen on the image display unit 110 is updated to a state which the operation key 121 corresponding to color copy is selected as shown in FIG. 20C. As a result, color copy is set as operation mode of the image processing device.

An image processing device conventionally employed as described above is based on the assumption of that a user performs log-in operation before using the image processing device. Therefore operation for logging into the image processing device is required even when the user makes black copy of a document in black and white, resulting in cumbersome operations.

Therefore it is assumed that the public mode in which only minimum functions can be used by all users are able to be used is set as an initial state while no specific user is logging into the image processing device. In this case, if black copy is not imposed a limitation on use, the user who would like to perform black copy is able to cause the image processing device executing black copy with remaining public mode without performing an operation for logging into the image processing device.

On the other hand, if color copy is imposed a limitation on use, operation sequence of a user who would like to perform color copy is as shown in FIGS. 21A, 21B, and 21C. FIGS. 21A, 21B, and 21C show exemplary operation sequence of the user on the operation panel 100 when color copy is performed in the image processing device which sets public mode as an initial state. When no specific user is logging into the image processing device, the image processing device is in operation in public mode. So, the image display unit 110 of the operation panel 100 shows an initial screen as shown in FIG. 21A. In this initial screen, functions for which all users are allowed to use are operable. Especially for items of selecting color mode, an item of "color" of the operation key 121 for setting color copy is displayed in inverted form indicating which is not selectable. In contrast, the operation key 122 for setting black copy is displayed in a normal form indicating which is selectable. In this initial state, the user cannot perform color copy, so the user is required to log into the image processing device. The user operates the operation key 123 for log-in and log-out in order to exit public mode for the meantime.

A display screen on the image display unit 110 then shows a screen prompting the user to log in as shown in FIG. 21B. The user enters a user name and a password by operating the operation key 124 showing "user name" and the operation key 125 showing "password". The user then operates the operation key 123 for log-in and log-out, thereby executing user authentication in the image processing device. As a result, if authentication results in success, the display screen on the image display unit 110 shows a copy mode operation screen as shown in FIG. 21C. In this copy mode operation screen, if the user logged into the image processing device is authorized to perform color copy, both of the operation key 121 for setting color copy and the operation key 122 for setting black copy are shown to be selectable as items of selecting color mode. The operation key 122 for black copy is selected in a default state. When the user logging in would like to perform color copy, the user operates the operation key 121 for setting color copy. The display screen on the image display unit 110 is then updated to a state that the operation key 121 corresponding to color copy is selected, and color copy is set as an operation mode of the image processing device as same as shown in FIG. 20C.

In case of setting public mode as the initial state as described, the user performs color copy in the image processing device needs to perform an operation to exit public mode at first and to perform a log-in operation at next. The user then needs to operate the operation key 121 for color copy. Therefore, in the image processing device sets public mode as the initial state, functions which are able to be used in public mode are easy to be used. However, where limited functions which are not able to be used in public mode are to be used, the number of operation on the operation panel 100 is increased compared with the number of operation explained with referring to FIGS. 20A, 20B and 20C, resulting in poorer operability.

SUMMARY OF THE INVENTION

In order to solve conventional issues as described above, the present invention is intended to provide an image processing device, an user authentication method and a program capable of improving operability on the operation panel when functions for which a limitation on use is imposed is being used.

First, the present invention is directed to an image processing device having an operation panel on which a plurality of operation keys is arranged.

According to one aspect of this invention, the image processing device comprises: a storage part for storing a key information allocated to a predetermined operation key of said a plurality of operation keys, and with which an user authentication information for authenticating a user authorized to use a function corresponding to the predetermined operation key and an authentication activation information in which conditions for user authentication to be executed when the predetermined operation key is operated are defined are associated; a key operation detection part for detecting any of a plurality of operation keys is operated; an authentication part for reading the user authentication information and the authentication activation information based on the key information when the key detection part detects the predetermined operation key is operated, and executing user authentication based on the user authentication information if conditions defined in the authentication activation information are met; and a key operation enabling part for enabling a key operation of the predetermined operation key when user authentication executed by the authentication part results in success.

According to another aspect of this invention, the authentication activation information preferably includes information of conditions corresponding to operation status of at least one of a plurality of operation keys other than the predetermined operation key or operation status of other functions besides function corresponding to the predetermined operation key are defined.

According to still another aspect of this invention, the image processing device preferably further comprises an operation key registration part for allocating the key information to at least one of the plurality of operation keys, associating the user authentication information and the authentication activation information input from the operation panel with the key information, and storing the key information, the user authentication information and the authentication activation information into the storage part.

According to still another aspect of this invention, the image processing device preferably further comprises: a communication part for transmitting and receiving data for data communication with an information processing device through a network; and an operation key registration part for registering at least one of new operation keys to use functions of the information processing device into the operation panel. When at least one of the new operation keys to use functions of the information processing device is registered into the operation panel, the operation key registration part preferably allocates the key information to at least one of new operation keys, associates the user authentication information and the authentication activation information input from the information processing device with the key information, and stores the key information, the user authentication information and the authentication activation information into the storage part.

Second, the present invention is directed to a user authentication method for authenticating a user who uses an image processing device having an operation panel on which a plurality of operation keys is arranged.

According to one aspect of this invention, the user authentication method comprises the steps of: (a) storing a key information allocated to a predetermined operation key of a plurality of operation keys, and with which an user authentication information for authenticating a user authorized to use a function corresponding to the predetermined operation key and an authentication activation information in which conditions for user authentication to be executed when the predetermined operation key is operated are defined are associated; (b) detecting any of a plurality of operation keys is operated; (c) reading the user authentication information and the authentication activation information based on the key information when the operation of the predetermined operation key is detected in the step (b), and executing user authentication based on the user authentication information if conditions defined in the authentication activation information are met; and (d) enabling a key operation of the predetermined operation key when user authentication executed in the step (c) results in success.

According to another aspect of this invention, the authentication activation information preferably includes information of conditions corresponding to operation status of at least one of a plurality of operation keys other than the predetermined operation key or operation status of other functions besides function corresponding to the predetermined operation key are defined.

According to still another aspect of this invention, the step (a) preferably includes the steps of: allocating the key information to at least one of the plurality of operation keys, associating the user authentication information and the authentication activation information input from the operation panel with the key information, and storing the key information, the user authentication information and the authentication activation information.

According to still another aspect of this invention, the user authentication method preferably further comprising the steps of: (e) transmitting and receiving data for data communication with an information processing device through a network; and (f) registering at least one of new operation keys to use functions of the information processing device into the operation panel. In the step (f), when at least one of new operation keys to use functions of the information processing device is registered into the operation panel, the key information is allocated to at least one of new operation keys, the user authentication information and the authentication activation information input from the information processing device are associated with the key information, and the key information, the user authentication information and the authentication activation information are stored.

Third, the present invention is directed to a program stored on a computer readable medium and executed by a computer of an image processing device having an operation panel on which a plurality of operation keys is arranged.

According to one aspect of this invention, the program causes the computer to execute processing comprising the steps of: (a) storing a key information allocated to a predetermined operation key of a plurality of operation keys, and with which an user authentication information for authenticating a user authorized to use a function corresponding to the predetermined operation key and an authentication activation information in which conditions for user authentication to be executed when the predetermined operation key is operated are defined are associated; (b) detecting any of a plurality of operation keys is operated; (c) reading the user authentication information and the authentication activation information based on the key information when the operation of the predetermined operation key is detected in the step (b), and executing user authentication based on the user authentication information if conditions defined in the authentication activation information are met; and (d) enabling a key operation of the predetermined operation key when user authentication executed in the step (c) results in success.

According to another aspect of this invention, the authentication activation information preferably includes information of conditions corresponding to operation status of at least one of a plurality of operation keys other than the predetermined operation key or operation status of other functions besides function corresponding to the predetermined operation key are defined.

According to still another aspect of this invention, the step (a) preferably includes the steps of: allocating the key information to said at least one of the plurality of operation keys, associating the user authentication information and the authentication activation information input from the operation panel with the key information, and the key information, storing the user authentication information and the authentication activation information.

According to still another aspect of this invention, the program preferably causes the computer to further execute processing comprising the steps of: (e) transmitting and receiving data for data communication with an information processing device through a network; and (f) registering at least one of new operation keys to use functions of the information processing device into the operation panel. In the step (f), when at least one of new operation keys to use functions of the information processing device is registered into the operation panel, the key information is allocated to at least one of new operation keys, the user authentication information and the authentication activation information input from the information processing device are associated with the key information, and the key information, the user authentication information and the authentication activation information are stored.

BRIEF DESCRIPTION OF THE DRAWINGS

FIG. 4 is a block diagram showing a detailed configuration of a controller in the image processing device;

FIG. 12 is a flow diagram for explaining main routine of the process executed by a CPU in the image processing device;

DESCRIPTION OF THE PREFERRED EMBODIMENTS

Figure 1:
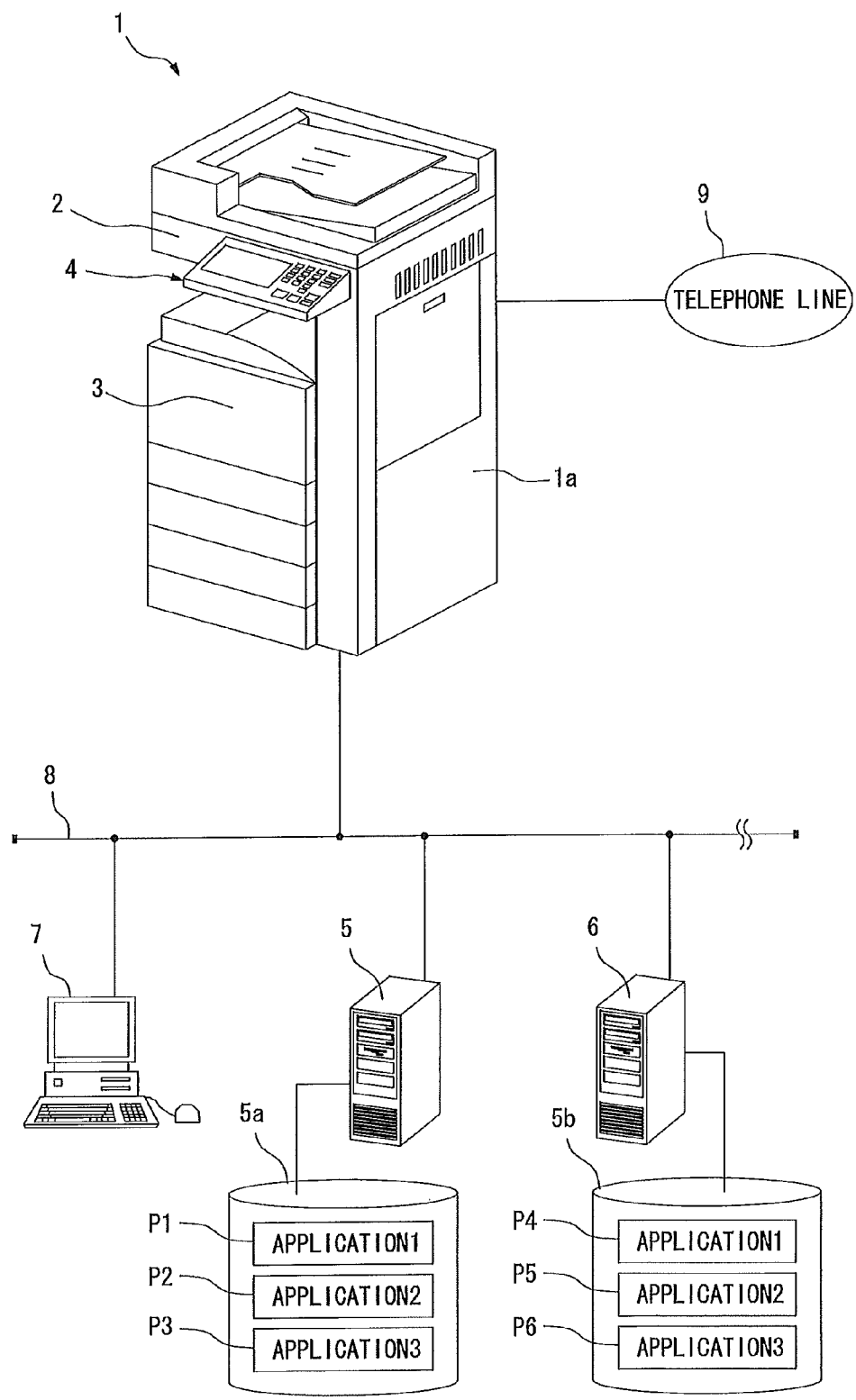
FIG. 1 shows an exemplary configuration of an image processing system into which an image processing device is incorporated.

Preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an image processing system including an image processing device 1 of the present preferred embodiment. As shown in FIG. 1, the image processing device 1 of the present preferred embodiment is a device what is generally called a complex device or MFPs (multifunction peripherals) having several functions such as a copier function, a scanner function, a FAX function, and a printer function, for instance. This image processing device 1 includes a scanner unit 2 set at the upper part of a device body 1a for reading the image of a document, and a printer unit 3 set at the lower part of the device body 1a for executing print output to print medium such as papers. An operation panel 4 can be operated by a user is set in front of the device body 1a.

The image processing device 1 is connected to a network 8 such as LAN or WAN. Information processing devices 5 and 6 used as server computers, and a user terminal device 7 used as a client computer are connected to the network 8 besides the image processing device 1. The image processing device 1 is so configured as to be able to transmit and receive data with the information processing devices 5 and 6 and with the user terminal device 7 through the network 8. The image processing device 1 is also connected to a telephone line 9. Fax data, for example, is transmitted and received through the telephone line 9.

Storage units 5a and 5b such as hard disk devices are respectively included inside of each of the information processing devices 5 and 6. In the storage units 5a and 5b, application programs which are preinstalled in each of the information processing devices 5 and 6 are stored. The example of FIG. 1 shows an exemplary case which three application programs P1, P2 and P3 of applications 1, 2 and 3 are installed in the information processing device 5, and another three application programs P4, P5 and P6 of the applications 1, 2 and 3 are installed in the information processing device 6. The application programs P1, P2, P3, P4, P5 and P6 have in common including which are programs related to image processing, for instance. However, functions realized by executing the programs are different from each other.

The image processing device 1 transmits and receives data with the information processing devices 5 and 6 through the network 8, thereby using functions realized by executing the each application programs P1, P2, P3, P4, P5 and P6 by the information processing devices 5 and 6. The image processing device 1 uses functions of the information processing devices 5 and 6 to share a part or all of image processing with the information processing devices 5 and 6. For example, when the image processing device 1 reads a document and scan transmits the generated image data to the user terminal device 7, a user selects at least one application program from the application programs P1, P2, P3, P4, P5 and P6 of the information processing devices 5 and 6. In that case, the image processing device 1 transmits image data generated by reading the document to the information processing device 5 or 6 which is selected. In the information processing device 5 or 6, selected application program is executed to perform predetermined image processing related to image data. After all that, processed image data is transmitted to the user terminal device 7. Thus, functions of the information processing devices 5 and 6 are used to share a part or all of image processing. As a result, the image processing device 1 is able to reduce load for image processing, thereby executing other jobs more efficiently.

Figure 2:
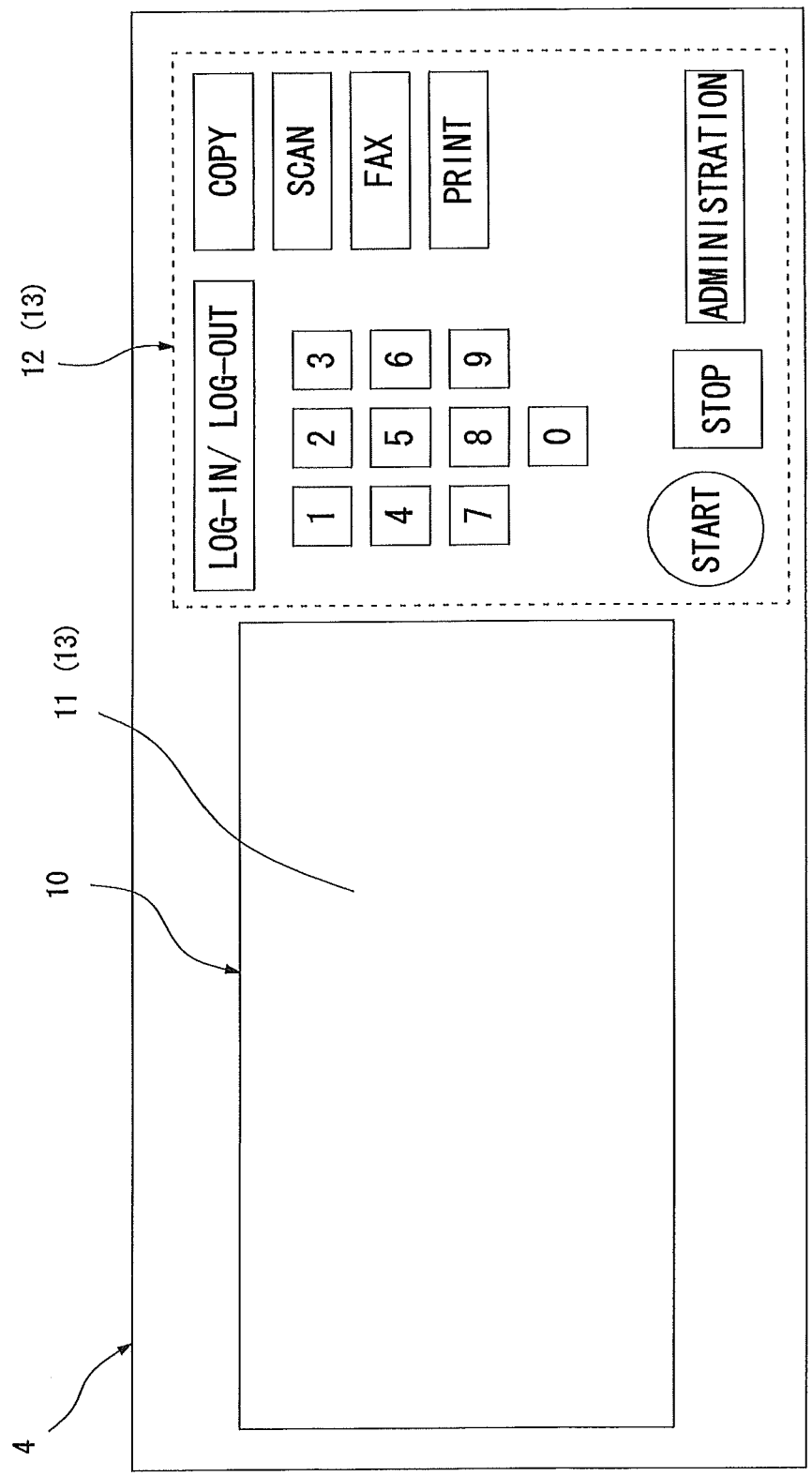
FIG. 2 is a two-dimensional diagram showing an enlarged operational panel of the image processing device.

FIG. 2 is a plain view diagram showing the enlarged operation panel 4 of the image processing device 1. As shown in FIG. 2, the operation panel 4 has an image display unit 10 which is so configured as arranging a touch panel sensor on a surface of the display screen of a liquid crystal display device and the like. The touch panel sensor arranged on the screen of the image display unit 10 forms a soft key 11. On the operation panel 4, a plurality of hard keys 12 are arranged around the image display unit 10, and are formed by push-button keys, for instance. The soft key 11 and a plurality of hard keys 12 are operable for a user. In this preferred embodiment, a plurality of operation keys 13 which are operable for a user are formed by the soft key 11 and the hard keys 12 arranged on the operation panel 4. With regard to the soft keys 11, a part which corresponds to an image of an operation key displayed on the display unit 10 forms one of the operation keys 13.

Figure 3:
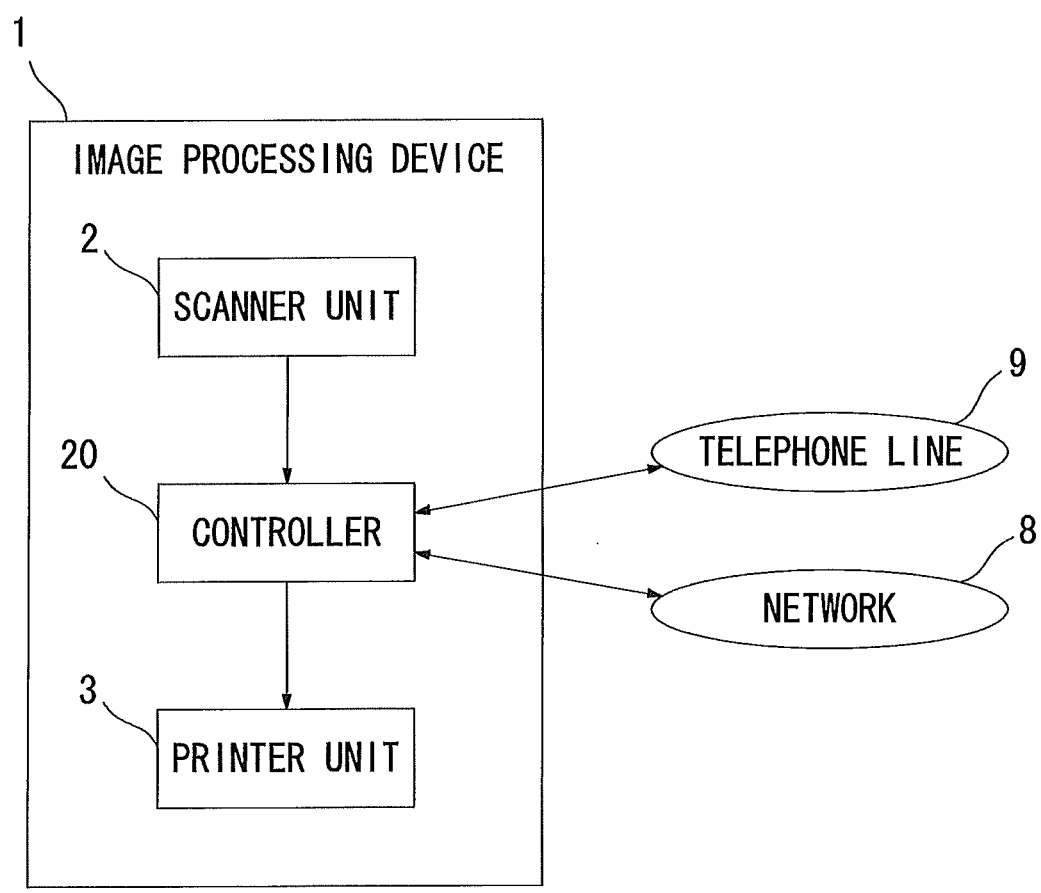
FIG. 3 is a block diagram showing an overview configuration of the image processing device.

FIG. 3 is a block diagram showing an overview configuration of the image processing device 1. The image processing device 1 includes a controller 20 inside of itself besides the scanner unit 2 and the printer unit 3 as described above. The controller 20 controls the execution of jobs in the image processing device 1. For example, when a function which is not imposed a limitation on use (black copy, for instance) is used in the image processing device 1, the controller 20 allows the execution of the job at any time and controls the execution of the job. On the other hand, when a function for which only specific user is authorized to use (color copy, for instance) is used, user authentication process is executed soon after one of the operation keys 13 corresponding to the function is operated. If authentication results in success, the controller 20 determines that the key operation is enabled, and allows the execution of the job and controls the execution of the job.

Where a copy job is executed in the image processing device 1, for example, the controller 20 controls the scanner unit 2 and the printer unit 3. The controller 20 inputs image data generated by a read document from the scanner unit 2. The controller 20 then outputs the image data to the printer unit 3 and causes the printer unit 3 to execute print output. Where a scan job is executed in the image processing device 1, the controller 20 controls the scanner unit 2. The controller 20 inputs the image data generated by a read document from the scanner unit 2. The controller 20 stores the image data therein, or outputs to the information processing device 5, 6 or the user terminal device 7 through the network 8. Where a fax job is executed in the image processing device 1, the controller 20 controls the scanner unit 2 for transmission. The controller 20 inputs the image data generated by a read document from the scanner unit 2. The controller 20 then outputs the image data to the telephone line 9, and transmits to other devices to which the image data is addressed. For receiving the fax data, the controller 20 inputs the fax data through the telephone line 9. The controller 20 then outputs the image data included in the fax data to the printer unit 3, and controls the printer unit 3 to cause it executing print output. Where a print job is executed in the image processing device 1, the controller 20 inputs image data through the network 8. The controller 20 outputs the image data to the printer unit 3 and controls the printer unit 3 to cause it executing print output.

FIG. 4 is a block diagram showing a detailed configuration of the controller 20 in the image processing device 1. The controller 20 includes a CPU 21, a RAM 22, an image memory 23, a hard disk drive 24, an input/output interface 25, a ROM 26, a facsimile modem 27, a network interface 28, the operation panel 4, and a nonvolatile memory 29 that are connected to each other through a data bus 30. The CPU 21 reads and executes a program 31 stored in the ROM 26, thereby controlling the overall operation of the image processing device 1. Moreover the CPU 21 executes various processing described later, and functions as a variety of processing unit by executing the program 31. The RAM 22 is a memory in which such as various kinds of parameters when the CPU 21 executes processing based on the program 31 are temporarily held. The image memory 23 is a memory in which image data input to the input/output interface 25 from the scanner unit 2, image data input to the network interface 28 from the network 8, or image data input to the facsimile modem 27 from the telephone line 9 are temporarily held. Image data held in the image memory 23 is executed various image processing by the CPU 21 as required. After that, the image data is stored in the hard disk drive 24, output to the printer unit 3 through the input/output interface 25, output to the network 8 through the network interface 28, or output to the telephone line 9 through the facsimile modem 27.

The CPU 21 controls the display screen displayed of the image display unit 10 of the operation panel 4 and sequentially checks to see the status of the operation of the operation keys 13 of the operation panel 4. When the CPU 21 displays an operation key on the image display unit 10 of the operation panel 4, the operation key is shown to be operable for all users whether or not a function corresponding to the operation key is imposed a limitation on use.

Figure 5A:
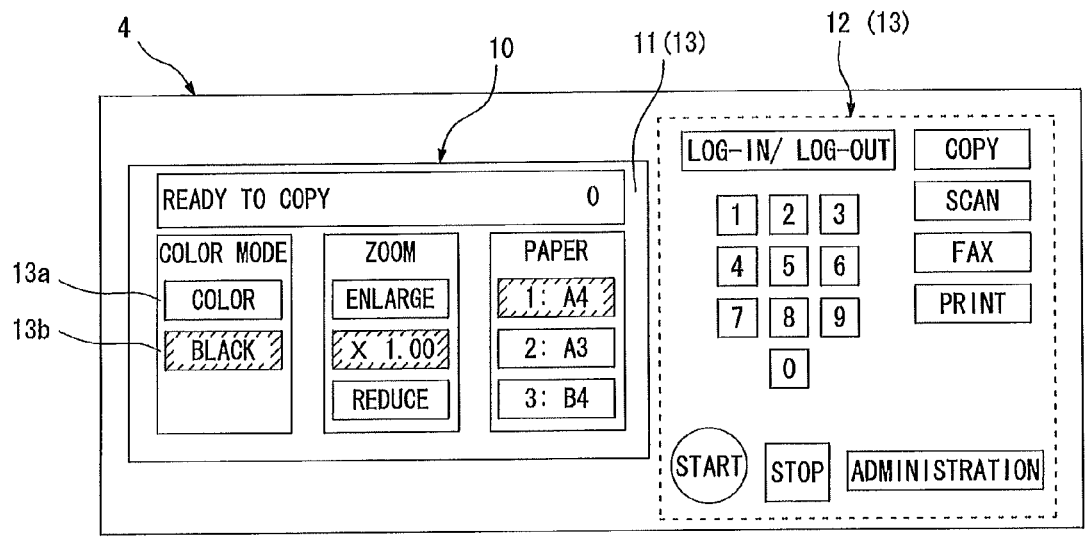
FIGS. 5A and 5B show exemplary initial screens of copy mode and scan mode displayed on an image display unit of the operation panel.
Figure 5B:
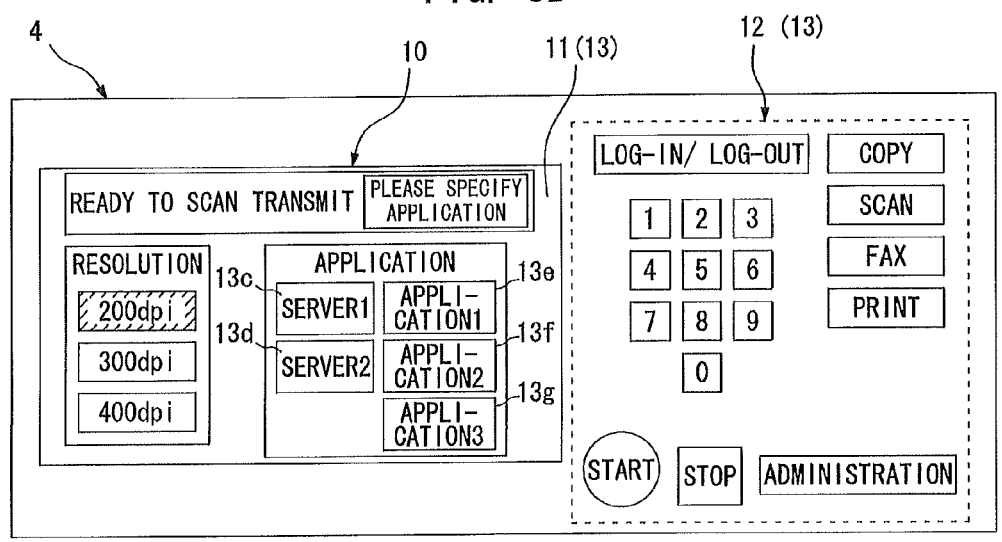

FIGS. 5A and 5B show an example of initial screens displayed on the image display unit 10 of the operation panel 4. FIG. 5A shows an initial screen of copy mode, and FIG. 5B shows an initial screen of scan mode. As shown in FIG. 5A, in the initial screen of copy mode, even if a color copy function is imposed a limitation on use, for example, an operation key 13a for "color" of color mode is shown to be operable for a user. That is, in the initial screen of FIG. 5A, both of the operation key 13a for setting color copy and an operation key 13b for setting black copy are shown to be operable as for items of selecting color mode. The operation key 13b for black copy is selected in a default state.

In the initial screen of scan mode as shown in FIG. 5B, operation keys for setting resolution, for example, and operation keys 13c, 13d, 13e, 13f and 13g for setting the execution of image processing with using functions of the information processing devices 5 and 6 for scan transmission are shown. "Server 1" of the operation key 13c is for designating the information processing device 5, and "Server 2" of the operation key 13d is for designating the information processing device 6. "Application 1" of the operation key 13e is for specifying each application 1 of the information processing devices 5 and 6, "Application 2" of the operation key 13f is for specifying each application 2 of the information processing devices 5 and 6, and "Application 3" of the operation key 13g is for specifying each application 3 of the information processing devices 5 and 6. Therefore, when functions of the information processing devices 5 and 6 are used for scan transmission, either of the operation key 13c or the operation key 13d is required to be selected to designate the information processing device, and one of the operation keys is required to be selected from the operation keys 13e, 13f and 13g to specify the application. In the initial screen, all of the operation keys 13c, 13d, 13e, 13f and 13g are shown to be operable for a user. None of those are selected in the default states.

If any of the operation keys is operated by a user, the operation panel 4 outputs an operation signal corresponding to the operated operation key to the CPU 21. For instance, when the soft key 11 arranged on the screen of the image display unit 10 is operated, the operation panel 4 outputs an operation signal indicating coordinates of positions operated on the display screen to the CPU 21. When one of the hard keys 12 is operated, the operation panel 4 outputs an operation signal corresponding to one of the hard keys 12 to the CPU 21.

The CPU 21 specifies which operation keys 13 have been operated by the user based on the operation signal input from the operation panel 4. The CPU 21 manages all the operation keys 13 arranged on the operation panel 4 with a key information 41 allocated to each of the operation keys 13 respectively. If the CPU 21 inputs the operation signal from the operation panel 4, the CPU 21 specifies the key information 41 corresponding to one of the operation keys 13 operated on the image display unit 10 based on the operation signal and screen information shown on the image display unit 10 and the like. The key information 41 is stored in the nonvolatile memory 29 as shown in FIG. 4. If at least one of new operation keys 13 is registered as operation keys to be shown on the image display unit 10, for instance, the key information 41 is newly registered with the newly registration of each of the operation keys 13.

Figure 6:
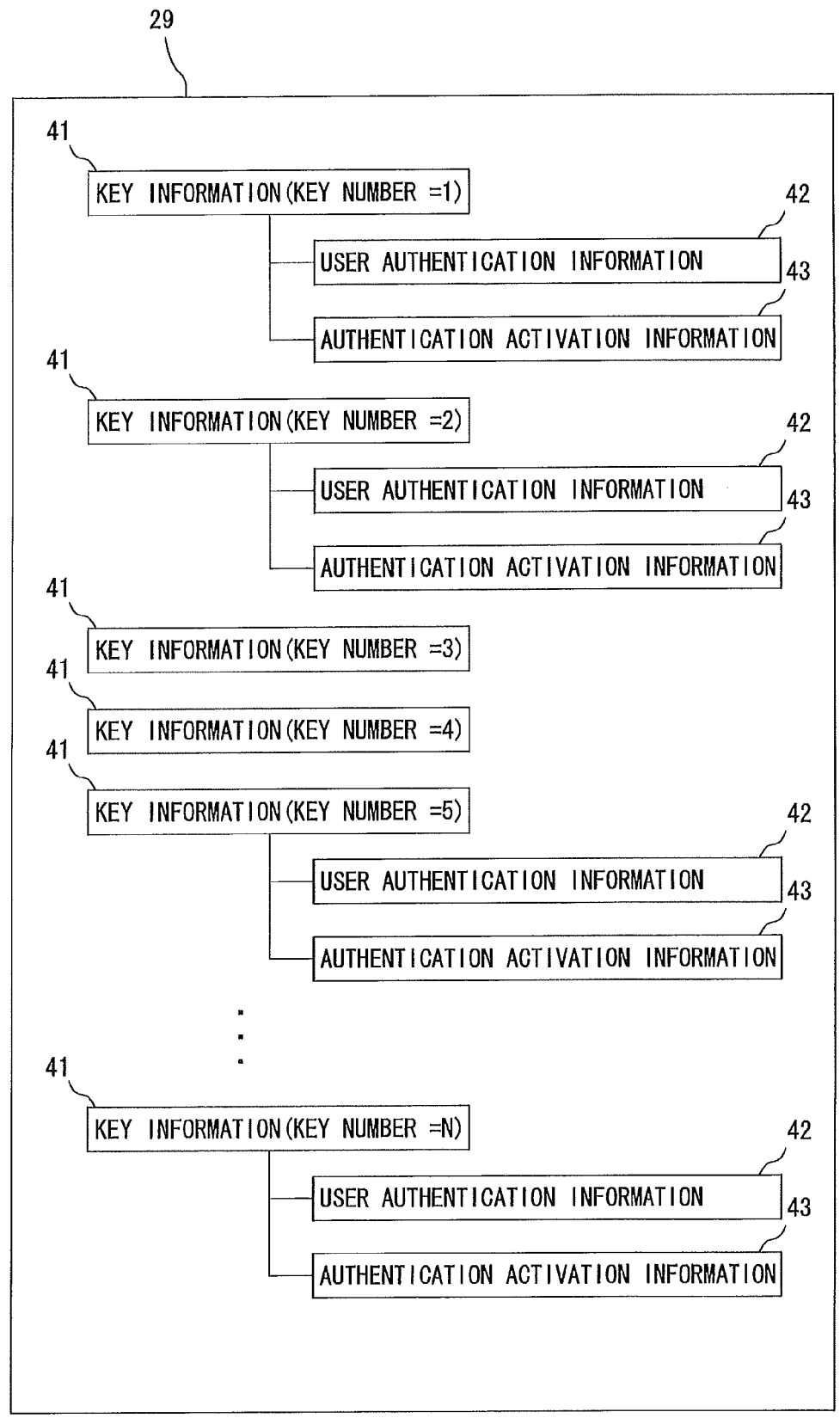
FIG. 6 is an example of a key information stored in a nonvolatile memory.

In case of a function corresponding to each of the operation keys 13 of the operation panel 4 is imposed a limitation on use for which only specific user has been authorized to use, an user authentication information 42 for authenticating a user who is authorized to use the function corresponding to each of the operation keys 13 and an authentication activation information 43 which contains conditions for user authentication to be executed when each of the operation keys 13 is operated are associated with the key information 41, and stored in the nonvolatile memory 29 by the CPU 21. FIG. 6 is an example of the key information 41 stored in the nonvolatile memory 29. In this preferred embodiment, key number individually allocated to each of the operation keys 13 is provided for the key information 41. In the example of FIG. 6, the user authentication information 42 and the authentication activation information 43 are associated with the key information 41 for which key numbers "1", "2", "5" and "N" are provided. When the CPU 21 detects that at least one of the operation keys 13 corresponding to those key numbers are operated, the user authentication information 42 and the authentication activation information 43 associated with the key information 41 are read from the nonvolatile memory 29. If operation status of the operation panel 4 or operation status of the image processing device 1 meets conditions predefined in the authentication activation information 43, user authentication process is executed based on the user authentication information 42. If user authentication results in success, the key operation of at least one of the operation keys 13 operated by the user is determined to be enabled, and the processing based on the key operation is executed. If user authentication results in failure, the user is determined as an unauthorized user to use the function corresponding to at least one of the operation keys 13 operated by the user, and the processing based on the key operation is not executed. Thus, in this preferred embodiment, when at least one of the operation keys 13 corresponding to the key information 41 with which the user authentication information 42 and the authentication activation information 43 are associated is operated by the user, user authentication process is executed at the time of being operated.

The user authentication information 42 includes information which may specify a user who uses the image processing device 1. In this preferred embodiment, the user authentication information 42 is consisted of a user name and a password. It is assumed that two or more users are authorized to use a function corresponding to one of the operation keys 13, user names and passwords of those two or more users are stored in the user authentication information 42. The user authentication information 42 is not limited to information consisted of the user name and the password. For example, the user authentication information 42 may be information specifies an individual user such as PIN code. In case of executing user authentication with a user authentication card, personal information recorded in the user authentication card may be used as the user authentication information. Moreover, if biometric authentication such as fingerprint authentication or vein authentication is executed, biological information detected by a biometric information reader may be used as the user authentication information.

Figure 7A:
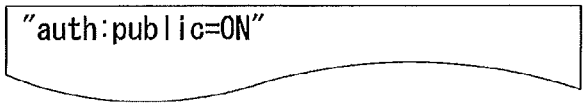
FIGS. 7A, 7B, 7C, 7D and 7E show exemplary definitions of conditions for user authentication to be executed in an authentication activation information.
Figure 7B:
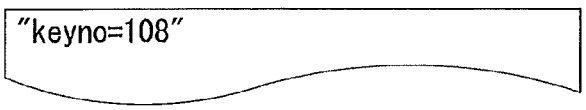
Figure 7C:
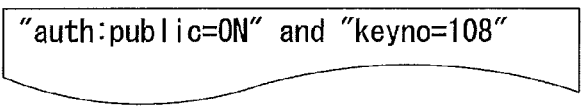
Figure 7D:
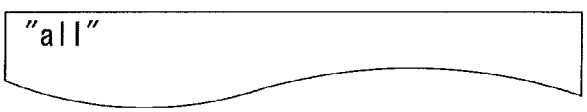
Figure 7E:
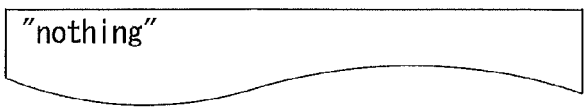

As described above, the authentication activation information 43 contains conditions for user authentication to be executed when at least one of predetermined operation keys 13 corresponding to the key information 41 are operated. In this information, operation status of operation keys 13 other than at least one of the predetermined operation keys 13 operated by the user or operation status of functions other than the function corresponding to at least one of the predetermined operation keys 13 are defined. FIGS. 7A, 7B, 7C, 7D and 7E show exemplary definitions of conditions for user authentication to be executed in the authentication activation information 43. FIG. 7A shows a condition for user authentication to be executed if one of the predetermined operation keys 13 is operated while public mode of the image processing device 1 is on. So, when one of the predetermined operation keys 13 corresponding to the key information 41 with which the authentication activation information 43 is associated is operated, the CPU 21 executes user authentication process if public mode is on. The CPU 21 does not execute user authentication process if public mode is off. FIG. 7B shows a condition for user authentication to be executed if one of the predetermined operation keys 13 is operated while one of the operation keys 13 allocated a key number "108" other than one of the predetermined operation keys 13 is on. So, when one of the predetermined operation keys 13 corresponding to the key information 41 with which the authentication activation information 43 as shown in FIG. 7B is associated is operated, the CPU 21 checks to see the status of one of the operation keys 13 with the key number "108". The CPU 21 executes user authentication process if one of the operation keys 13 with the key number "108" is on, but does not execute user authentication process if one of the operation keys 13 with the key number "108" is off. FIG. 7C shows a condition for user authentication to be executed if one of the predetermined operation keys 13 is operated while public mode of the image processing device 1 is on and one of the operation keys 13 allocated a key number "108" other than one of the predetermined operation keys 13 is on. So, when one of the predetermined operation keys 13 corresponding to the key information 41 with which the authentication activation information 43 is associated is operated, the CPU 21 executes user authentication process if public mode is on and one of the operation keys 13 with the key number "108" is on, but does not execute user authentication process if public mode is off and one of the operation keys 13 with the key number "108" is off. FIG. 7D shows a condition for user authentication to be executed every time when at least one of the predetermined operation keys 13 corresponding to the key information 41 with which the authentication activation information 43 is associated is operated. So, when at least one of the predetermined operation keys 13 corresponding to the key information 41 with which the authentication activation information 43 is associated is operated, the CPU 21 responds and executes user authentication process without fail. FIG. 7E shows a condition for user authentication not to be executed when at least one of the predetermined operation keys 13 corresponding to the key information 41 with which the authentication activation information 43 is associated is operated. So, when at least one of the predetermined operation keys 13 corresponding to the key information 41 with which the authentication activation information 43 is associated is operated, the CPU 21 does not execute user authentication process. That is, if the condition shown in FIG. 7E is defined for the authentication activation information 43, at least one of the predetermined operation keys 13 corresponding to the key information 41 with which the authentication activation information 43 is associated is not imposed a limitation on use.

The user authentication information 42 and the authentication activation information 43 may be set and registered in advance for each of the operation keys 13 of the operation panel 4 by an administrator of the image processing device 1. An access control information 49 for distinguishing whether the administrator is authorized or unauthorized is stored in the nonvolatile memory 29. The CPU 21 executes authentication of the administrator based on the access control information 49. If authentication results in success, the user authentication information 42 and the authentication activation information 43 registered by the administrator are associated with the key information 41 of each of the operation keys 13 respectively and stored into the nonvolatile memory 29.

Figure 8A:
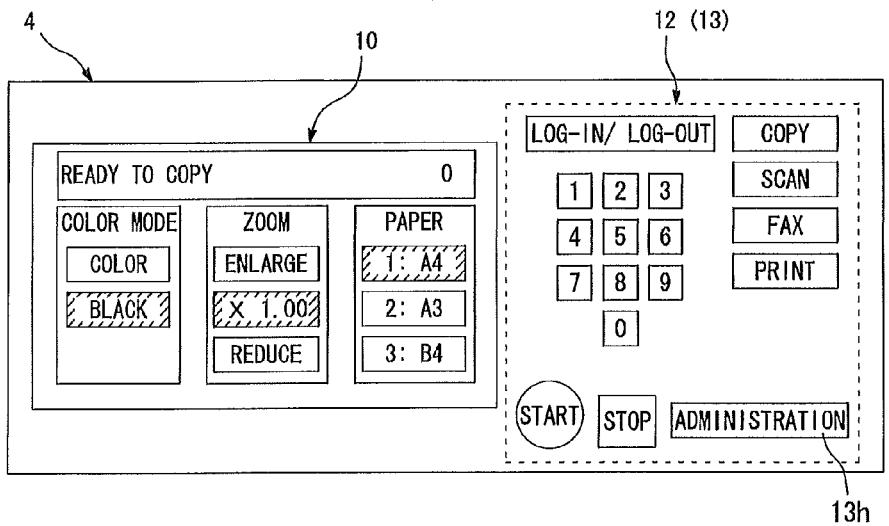
FIGS. 8A, 8B, and 8C show an exemplary operation sequence of registering a user authentication information and the authentication activation information into the key information corresponding to one of the operation keys through the operation panel.
Figure 8B:
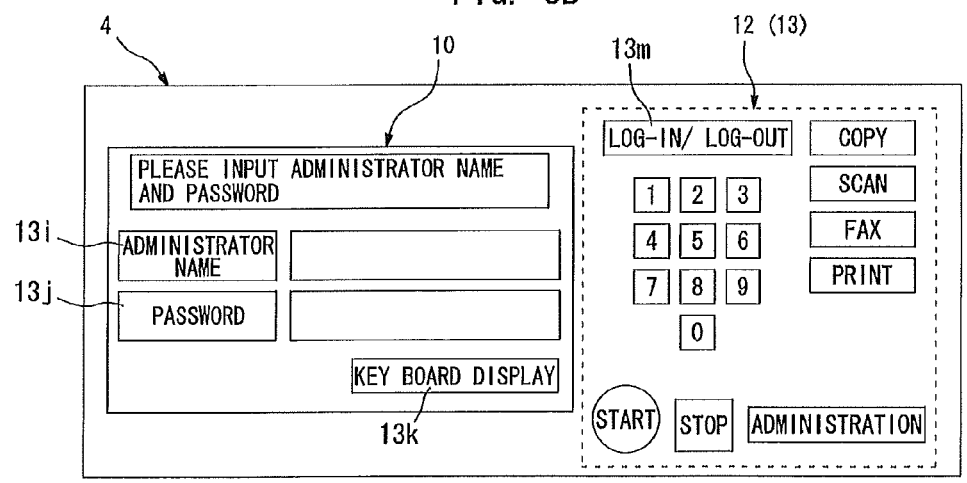
Figure 8C:
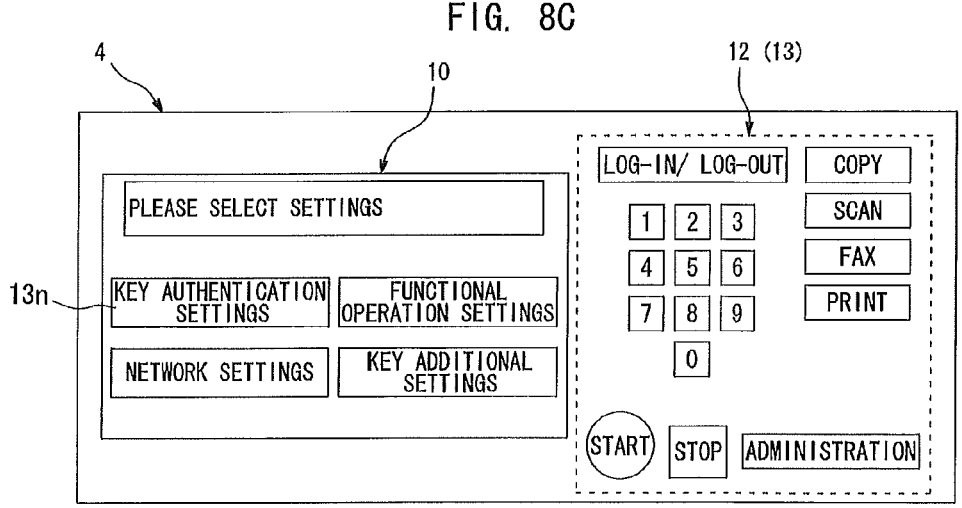

FIGS. 8A, 8B and 8C and FIGS. 9A, 9B and 9C show an exemplary operation sequence of registering the user authentication information 42 and the authentication activation information 43 into the key information 41 corresponding to one of the operation keys 13 through the operation panel 4. For instance, when the operation panel 4 of the image processing device 1 shows as illustrated in FIG. 8A, the administrator operates an operation key 13h for "administration". The display screen of the image display unit 10 then shows a screen prompting the administrator to log in as illustrated in FIG. 8B. Here, the administrator operates an operation key 13i showing "administrator name" and an operation key 13j showing "password", and enters the administrator name and his or her password. As required, if an operation key 13k showing "keyboard display" is operated, image of a keyboard is displayed on the image display unit 10, so that arbitrary text can be input with operating each key of the keyboard. After the administrator name and the password are entered, authentication of the administrator is executed in the image processing device 1 by an operation key 13m showing "log-in/log-out" being operated. If authentication results in success, the display screen of the image display unit 10 then shows a screen displaying settings which are able to be configured by the administrator as illustrated in FIG. 8C. Here, the administrator operates an operation key 13n showing "key authentication settings", so that the screen changes, and the administrator is able to configure user authentication settings for each of the operation keys 13 on the operation panel 4.

Figure 9A:
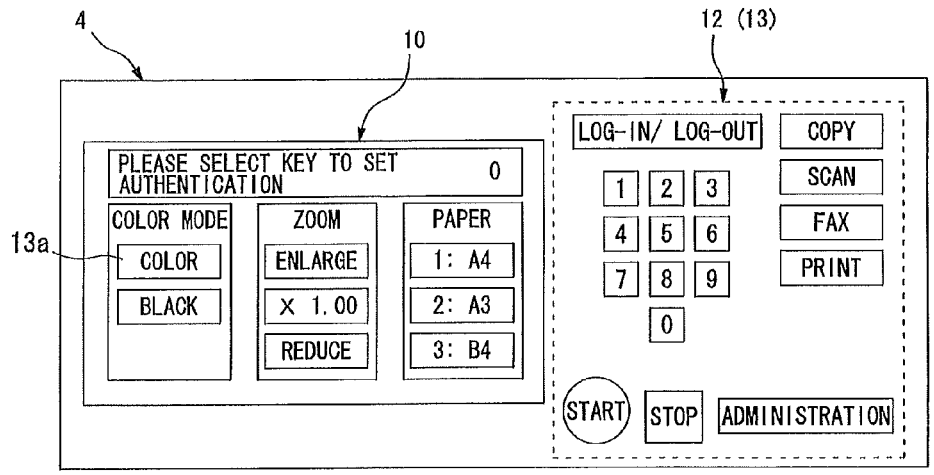
FIGS. 9A, 9B, and 9C show an exemplary operation sequence of registering a user authentication information and the authentication activation information into the key information corresponding to one of the operation keys through the operation panel.
Figure 9B:
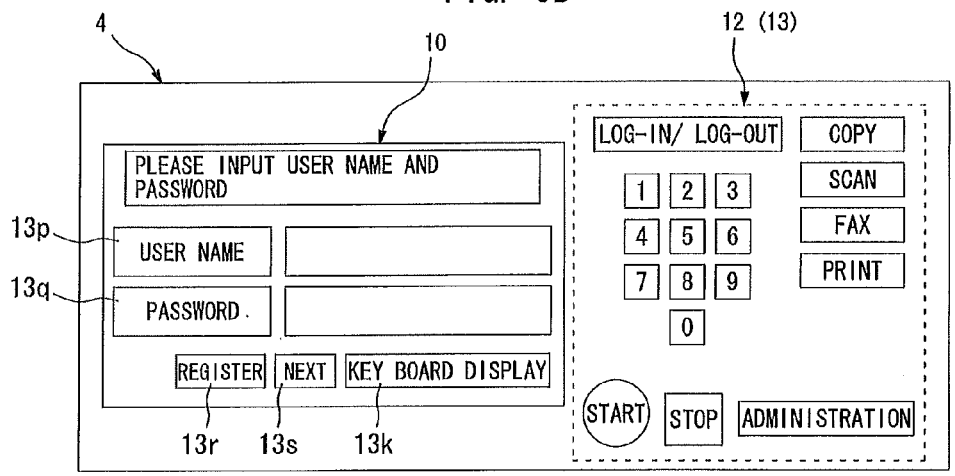

For instance, in case of user authentication settings for at least one of the operation keys 13 of the copy mode are to be configured, the display screen of the image display unit 10 shows a copy mode operation screen as illustrated in FIG. 9A. If, for example, users who are authorized to perform color copy are to be restricted, the administrator operates the operation key 13a showing "color". At that time, the CPU 21 specifies the operation key targeted for user authentication settings. The display screen of the image display unit 10 then shows a screen for registering a user name and a password of a user who is authorized to perform color copy as illustrated in FIG. 9B. That is the display screen of FIG. 9B is the screen for registering the user authentication information 42. The administrator operates an operation key 13p showing "user name" and an operation key 13q showing "password" to enter a user name for which color copy is authorized and a password corresponding to a user. As required, if an operation key 13k showing "keyboard display" is operated, image of a keyboard is displayed on the image display unit 10, so that arbitrary text can be input with operating each key of the keyboard. After the user name and the password are entered, the administrator operates an operation key 13r showing "register". As a result, the entered user name and password are added into the user authentication information 42, and the administrator is able to enter next user name and password. After user names and passwords of all users authorized to perform color copy are entered, the administrator operates an operation key 13s showing "next". The display screen of the image display unit 10 then shows a screen for entering conditions for executing user authentication as illustrated in FIG.

Figure 9C:
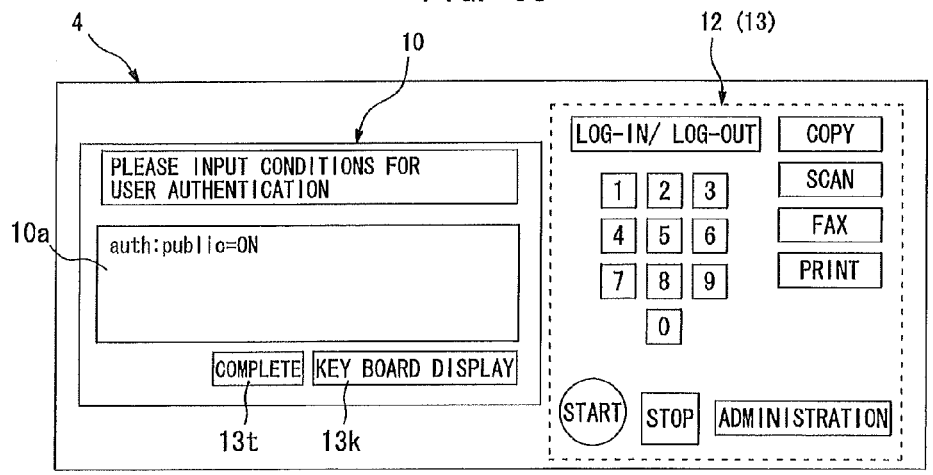

9C. That is, the display screen of FIG. 9C is the screen for registering the authentication activation information 43. The administrator enters conditions for executing user authentication in an entry field 10a. As required, if an operation key 13k showing "keyboard display" is operated, image of a keyboard is displayed on the image display unit 10, so that arbitrary text can be input with operating each key of the keyboard. After the conditions for executing user authentication is entered, the administrator operates an operation key 13t showing "complete". So, the entered conditions are added into the authentication activation information 43. As a result, the user authentication information 42 and the authentication activation information 43 registered as explained above are associated with the key information 41 corresponding to the operation key 13a for "color", and stored into the nonvolatile memory 29.

Figure 10A:
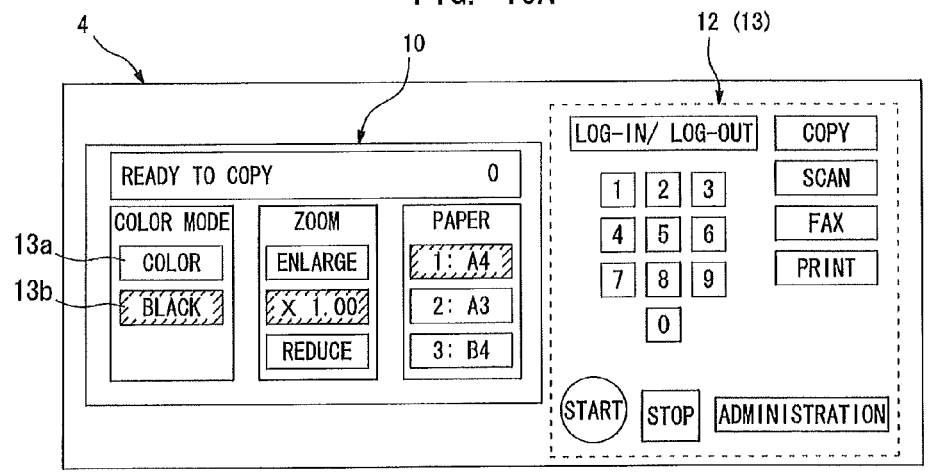
FIGS. 10A, 10B, and 10C show an exemplary operation sequence performed on the operation panel where color copy is used in copy mode.
Figure 10B:
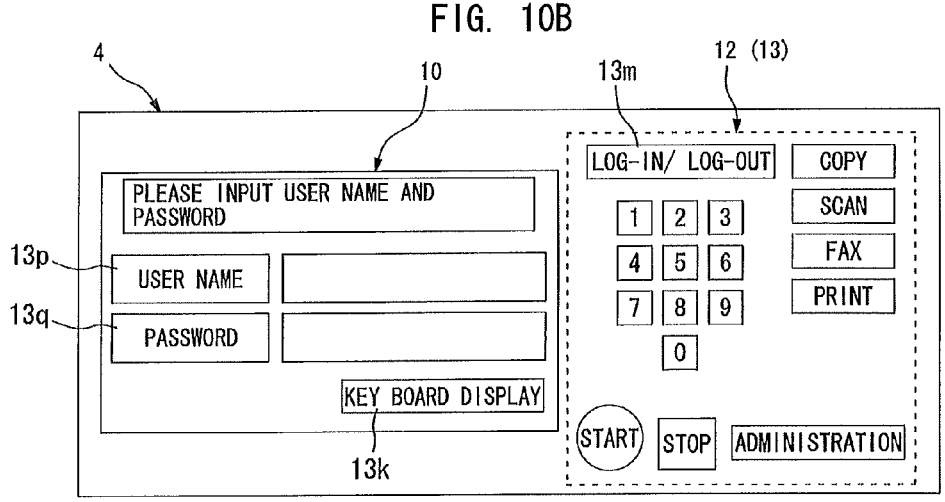
Figure 10C:
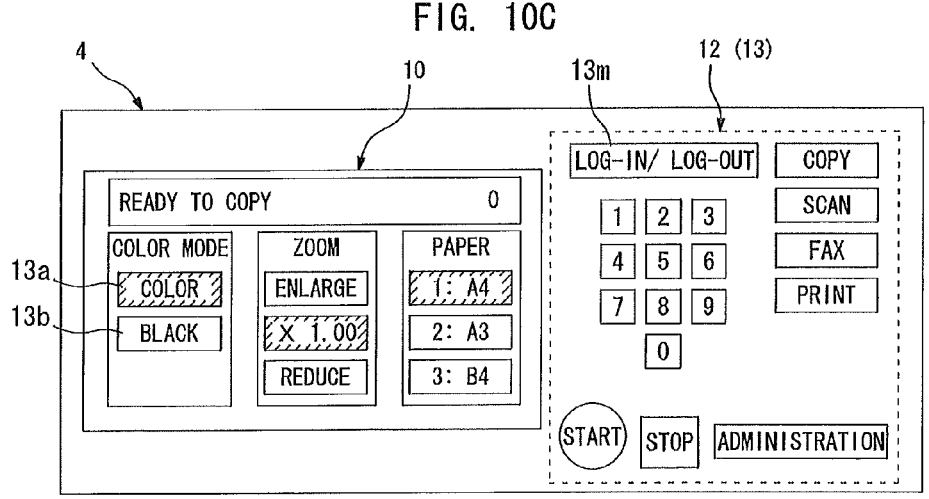

Next, operation sequence when a user uses the image processing device 1 is described. FIGS. 10A, 10B, and 10C show an exemplary operation sequence performed on the operation panel 4 where color copy is performed in copy mode. A user who would like to perform color copy operates the operation key 13a showing "color" while an initial screen of copy mode as illustrated in FIG. 10A is displayed. The user authentication information 42 and the authentication activation information 43 registered by the administrator are associated with the key information 41 corresponding to the operation key 13a for "color". In the authentication activation information 43, a condition for executing user authentication without fail is defined, for example. According to the operation of the operation key 13a for "color", user authentication process is started in the image processing device 1, and the display screen of the image display unit 10 shows a screen for entering a user name and a password as illustrated in FIG. 10B. Therefore, the display screen of FIG. 10B is for the user who performs color copy to execute user authentication. The user operates the operation key 13p showing "user name" and the operation key 13q showing "password" to enter his or her user name and password. As required, if an operation key 13k showing "keyboard display" is operated, image of a keyboard is displayed on the image display unit 10, so that arbitrary text can be input with operating each key of the keyboard. After the user name and the password are entered, the user operates the operation key 13m showing "log-in/log-out", thereby executing user authentication to check the user authentication information 42 associated with the key information 41 against information entered by the user in the image processing device 1. If user authentication results in success, key operation of the operation key 13a is enabled. The display screen of the image display unit 10 shows an operation screen of copy mode with "color" is selected as illustrated in FIG. 10C. Therefore, the user places a document on the scanner unit 2 and operates a start key on the operation panel 4, and the user is able to perform color copy of the document.

If the user operates the operation key 13b for "black" or the operation key 13m for "log in/log out" on the operation screen of copy mode with "color" is selected as illustrated in FIG. 10C, the display screen of the image display unit 10 returns to the one of the FIG. 10A. In this case, key operation of the operation key 13a for "color" is disabled. In this preferred embodiment, specific function of the image processing device 1 is enabled as a result of the execution of user authentication based on key operation. In this case, if any negative function against the enabled function is selected afterwards, the enabled key is disabled. For example, the operation key 13b for "black" and the operation key 13m for "log-in/log-out" are registered in advance as disabling keys to disable key operation when which of the operation key 13a for "color" is enabled. As a result, if the operation key 13b or the operation key 13m is operated, color copy function corresponding to the operation key 13a can be disabled.

In contrast, in case of a user who would like to use black copy (black-and-white copy) while the initial screen of copy mode as illustrated in FIG. 10A is displayed, the user places a document on the scanner unit 2 and operates the start key of the operation panel 4, and the user is able to perform black copy of the document.

Therefore, for the image processing device 1 in this preferred embodiment, the user is not necessary to perform log-in operation to log into the image processing device 1 when the user makes black copy of a black and white document. Furthermore, the user is not necessary to perform operation to exit public mode when the user performs color copy. So, the number of operation of the user on the operation panel 4 is reduced, resulting in improving operability.

Figure 11A:
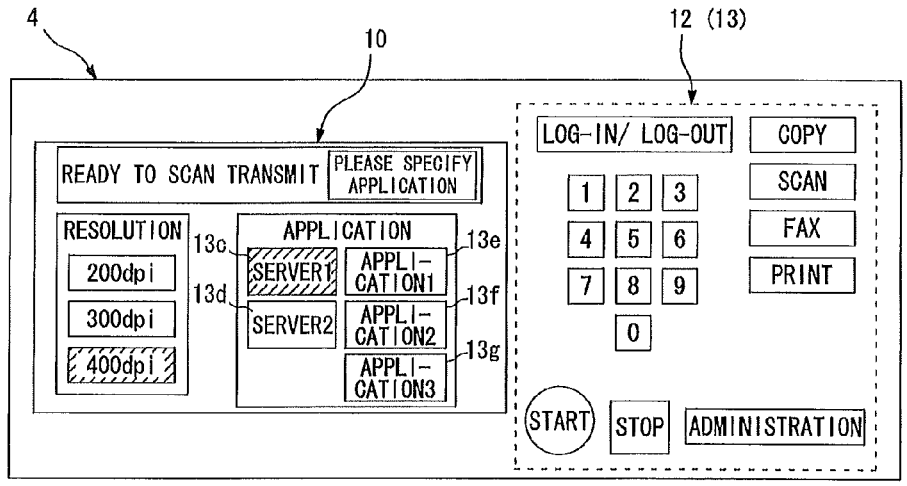
FIGS. 11A, 11B, and 11C show an exemplary operation sequence performed on the operation panel where scan transmission is executed in scan mode.
Figure 11B:
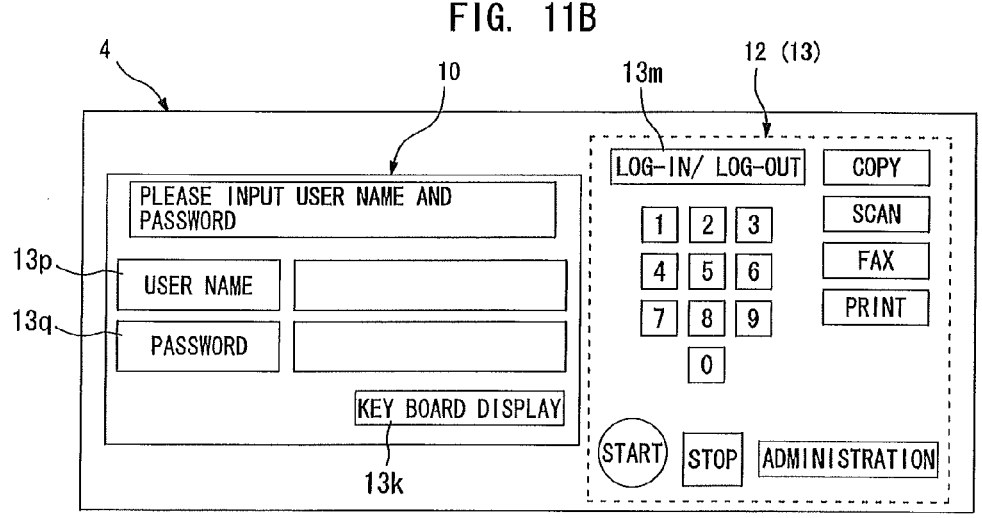
Figure 11C:
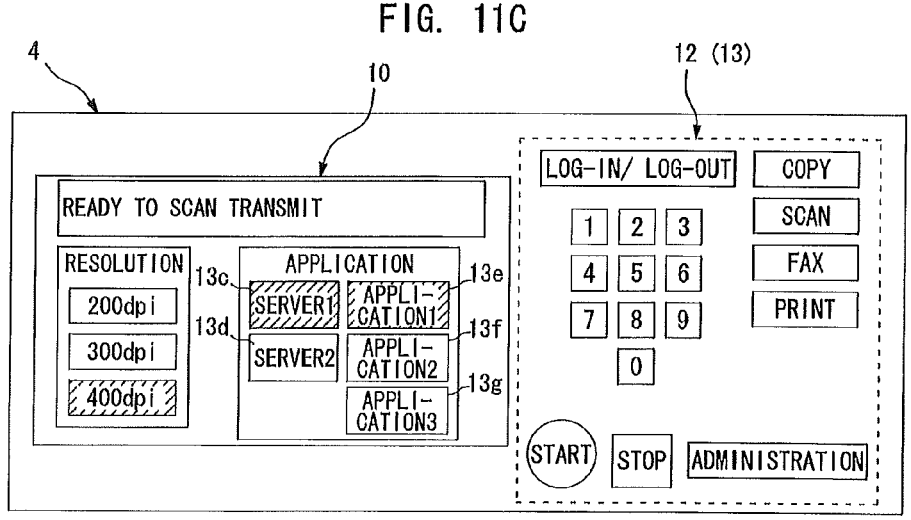

FIGS. 11A, 11B, and 11C show an exemplary operation sequence performed on the operation panel 4 where scan transmission is executed in scan mode. In this preferred embodiment, as an example, the information processing device 5 is assumed to be more sophisticated than the information processing device 6, and function of each of the applications 1, 2 and 3 of the information processing device 5 is imposed a limitation on use to restrict the user uses each function. The applications 1, 2 and 3 of the information processing device 5 are functions realized by respectively executing the application programs P1, P2 and P3 preinstalled in the information processing device 5. In this case, the user authentication information 42 and the authentication activation information 43 are respectively associated with each of the key information 41 corresponding to the operation key 13e for "application 1", the operation key 13f for "application 2", and the operation key 13g for "application 3". In each of the authentication activation information 43, the operation key 13c for "server 1" to be operated is defined as for a condition of user authentication.

For instance, when the user uses the application 1 of the information processing device 5 for scan transmission, the user operates the operation key 13c for "server 1". The display screen of the image display unit 10 shows that the operation key 13c for "server 1" is selected as illustrated in FIG. 11A. Next, the user operates the operation key 13e for "application 1" to specify the application 1 of "server 1". The user authentication information 42 and the authentication activation information 43 which have been registered by the administrator are associated with the key information 41 corresponding to the operation key 13e for "application 1". In the authentication activation information 43, the operation key 13c for "server 1" to be operated is defined as for the condition. According to the operation key 13e for "application 1" is operated with the operation key 13c for "server 1" is selected, user authentication process is started in the image processing device 1. The display screen of the image display unit 10 shows a screen for entering a user name and a password as illustrated in FIG. 11B. The display screen of FIG. 11B is for the user uses the function of the application 1 of the information processing device 5 for scan transmission to execute user authentication. Here, the user operates the operation key 13p showing "user name" and the operation key 13q showing "password" to enter his or her user name and password. As required, if an operation key 13k showing "keyboard display" is operated, image of a keyboard is displayed on the image display unit 10, so that arbitrary text can be input with operating each key of the keyboard. After the user name and the password are entered, the operation key 13m showing "log-in/log-out" is operated next, thereby executing user authentication to check the user authentication information 42 associated with the key information 41 corresponding to the operation key 13e against information the user entered in the image processing device 1. If user authentication results in success, key operation of operation key 13e is enabled. As a result, the display screen of the image display unit 10 shows an operation screen for scan transmission with "server 1" and "application 1" are selected as illustrated in FIG. 11C. The user places a document on the scanner unit 2 and operates the start key on the operation panel 4. Then, a scan transmission job is executed, and image data is transmitted to the information processing device 5. In the information processing device 5, the application program P1 corresponding to the application 1 is executed, so image processing of the image data input from the image processing device 1 is executed. The image data processed by the information processing device 5 is transmitted to the user terminal device 7, for example.

In contrast, for instance, when the user uses each application of the information processing device 6 for scan transmission, each application of the information processing device 6 is not imposed a limitation on use. The user operates the operation key 13d for "server 2" to select "server 2". If the user operates any of the operation key 13e for "application 1", the operation key 13f for "application 2" or the operation key 13g for "application 3" in the state, the execution of scan transmission job is instructed without user authentication.

Thus, in this preferred embodiment, operation status of operation keys other than predetermined operation key and/or operation status of functions besides a function of the predetermined operation key can be defined as conditions for executing user authentication in the authentication activation information 43. Therefore, even if the same operation key is operated, whether or not user authentication to be executed is free to be set depending on the operation status of operation keys other than the predetermined operation key or the operation status of the image processing device 1, for example. Whether or not the operation requires user authentication can be set in detail for each of a plurality of operation keys 13 arranged on the operation panel 4. As a result, not only the number of user's operation on the operation panel 4 is minimized but also users authorized to use each function of the image processing device 1 can be restricted.

Next, sequence of the image processing device 1 is explained. FIG. 12 to FIG. 19 are flow diagrams for explaining an exemplary process sequence realized by executing the program 31 by the CPU 21 in the image processing device 1. FIG. 12 is a flow diagram for explaining main routine of the process sequence executed by the CPU 21. When the image processing device 1 is powered on, the CPU 21 reads the program 31 from the ROM 26 and executes, thereby repeatedly executing an operation panel processing (step S1), an image input (step S2), an image output (step S3), a fax communication (step S4), and a network processing (step S5).

The operation panel processing (step S1) is to execute the processing based on the operation of each of the operation keys 13 of the operation panel 4. The operation panel processing (step S1) is explained in detail later. The image input (step S2) is to input image data from the scanner unit 2 and to store it into the image memory 23 by controlling the scanner unit 2. The image output processing (step S3) is to output the image data stored in the image memory 23 to the printer unit 3, and to execute print output of image by controlling the printer unit 3. The fax communication (step S4) is to transmit and receive fax data through the telephone line 9. The network processing (step S5) is to execute data communication with the information processing devices 5, 6, and the user terminal device 7 through the network 8, and to execute processing accompanied with the data communication. The network processing (step S5) is explained in detail later.

Figure 13:
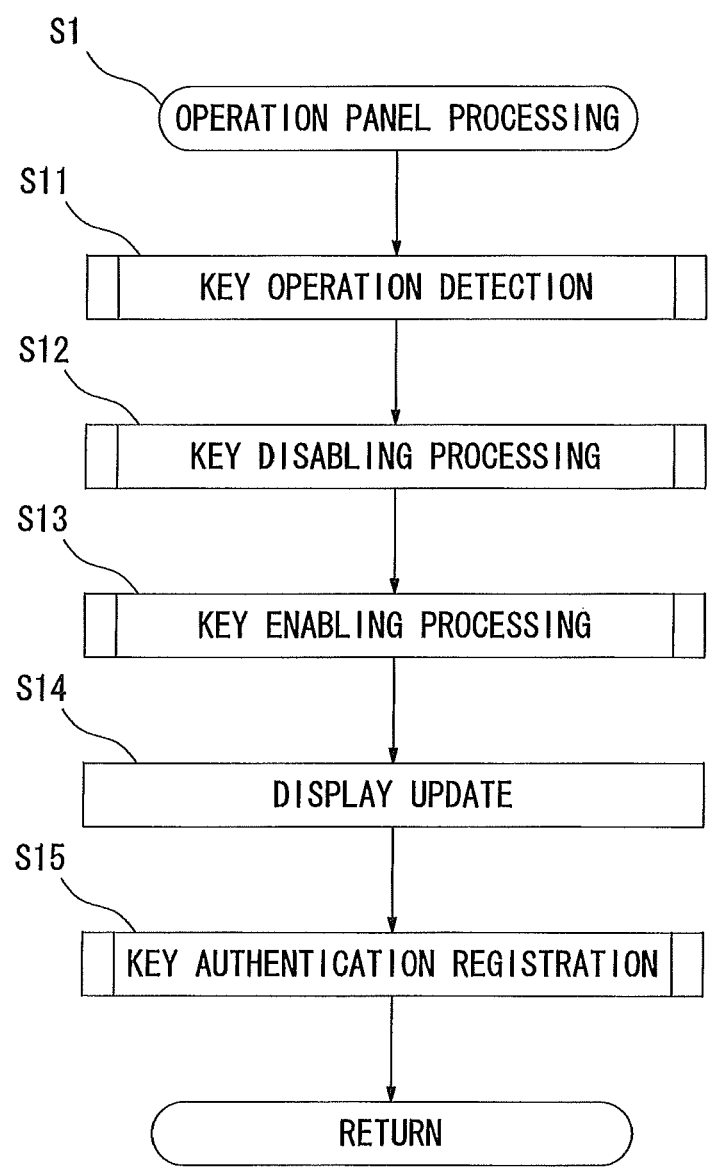
FIG. 13 is a flow diagram for explaining an operation panel processing in detail.
Figure 14:
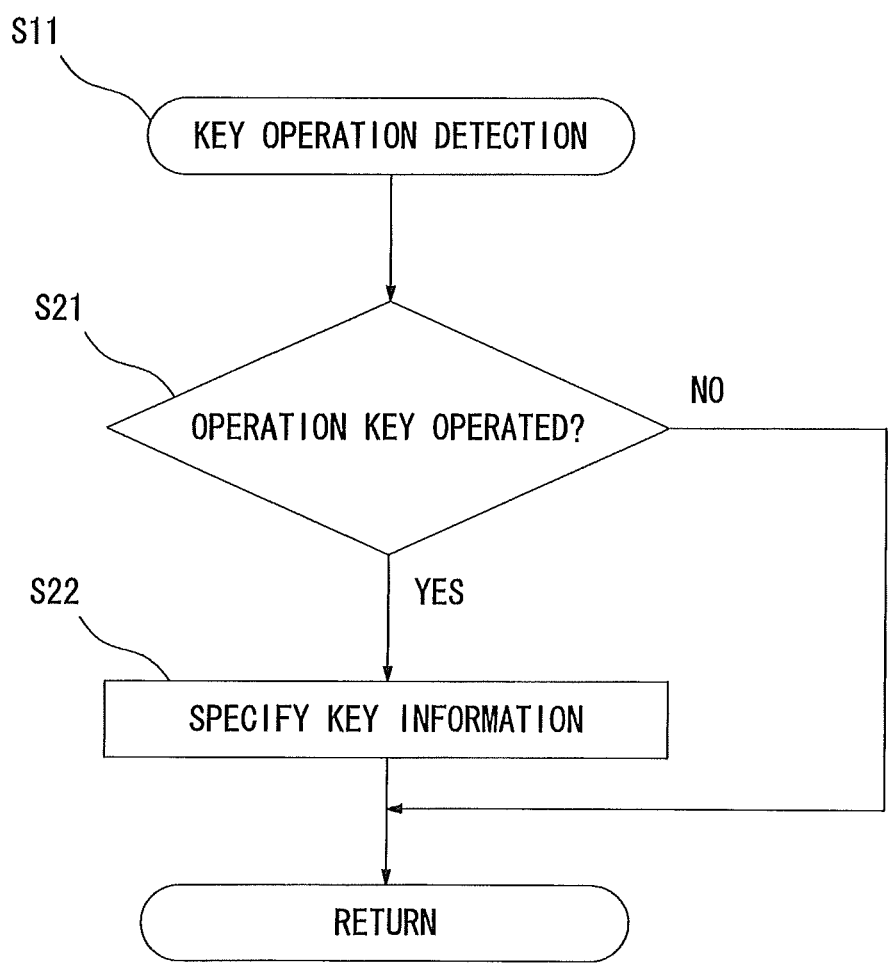
FIG. 14 is a flow diagram for explaining a key operation detection in detail.

FIG. 13 is a flow diagram for explaining the operation panel processing (step S1) in detail. In the operation panel processing, key operation detection (step S11) is performed at first. Here, the CPU 21 comes into operation to function as a key operation detection part. FIG. 14 is a flow diagram for explaining the key operation detection process in detail. The CPU 21 determines whether or not any of the operation keys 13 of the operation panel 4 was operated based on whether or not the CPU 21 input an operation signal from the operation panel 4 (step S21). If operation is not detected, the key operation detection process is completed. If any operation is detected, the CPU 21 specifies the key information 41 based on the operation signal input from the operation panel 4 (step S22). As a result, the key information 41 corresponding to one of the operation keys 13 operated by the user is specified. The key operation detection process completes, and the flow returns to the flow diagram of FIG. 13.

Figure 15:
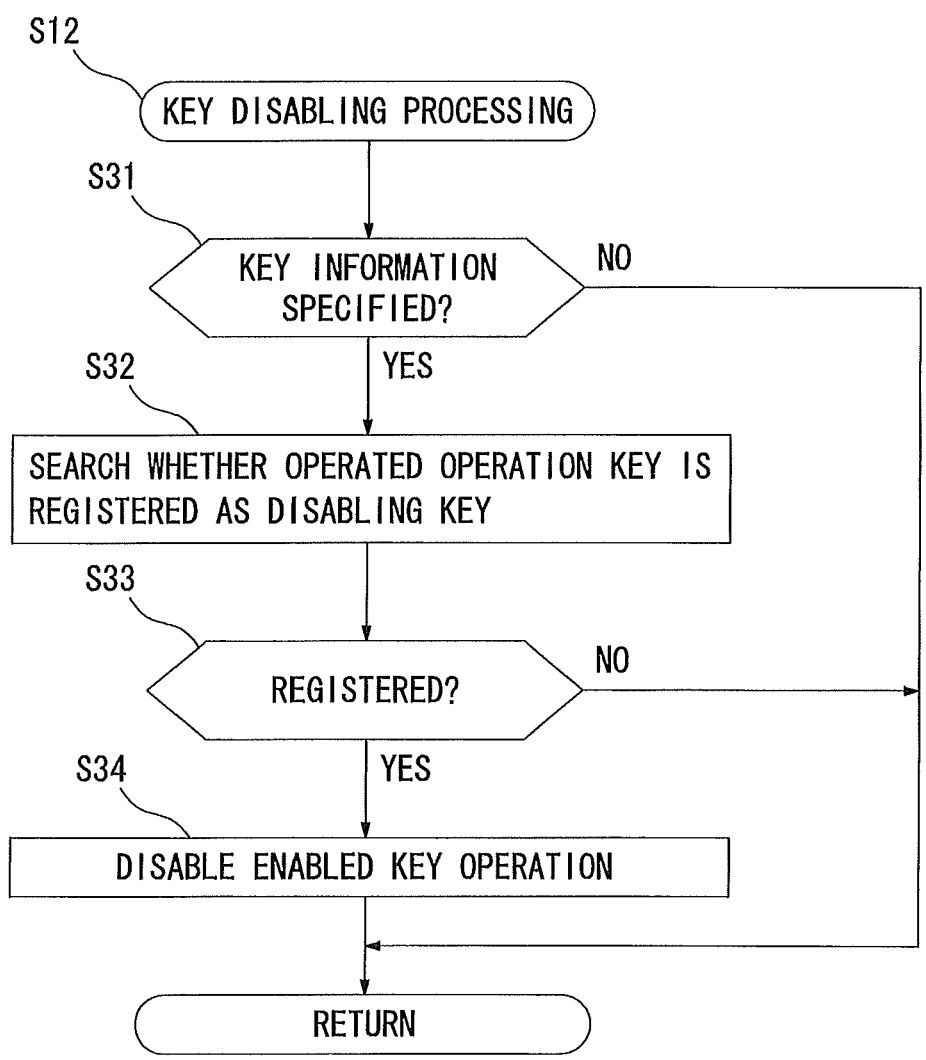
FIG. 15 FIG. 15 is a flow diagram for explaining a key disabling processing in detail.

After the key operation detection (step S11), a key disabling processing (step S12) follows. The CPU 21 comes into operation to function as a key operation disabling part here. FIG. 15 is a flow diagram for explaining the key disabling processing in detail. The CPU 21 determines whether or not the key information 41 is specified in the key operation detection (step S31). If the key information 41 is not specified, it is assumed that no operation on the operation panel 4 was performed. In this case, the key disabling processing completes here. If the key information 41 is specified, the CPU 21 searches whether or not the operation key corresponding to the key information 41 is registered as a disabling key (step S32). The CPU 21 then determines whether or not the operation key corresponding to the key information 41 is registered as a disabling key (step S33). If the operation key corresponding to the key information 41 is not registered as a disabling key, no specific process is necessary, and the key disabling processing completes here. If the operation key corresponding to the key information 41 is registered as a disabling key, the key operation which is presently enabled in the image processing device 1 is disabled (step S34). For instance, if a user operates the operation key 13b for "black" or the operation key 13m for "log-in/log-out" in a state of that color copy is able to be performed; color copy function is not available anymore because of the key disabling processing. The flow returns to the process shown in the flow diagram of FIG. 13.

Figure 16:
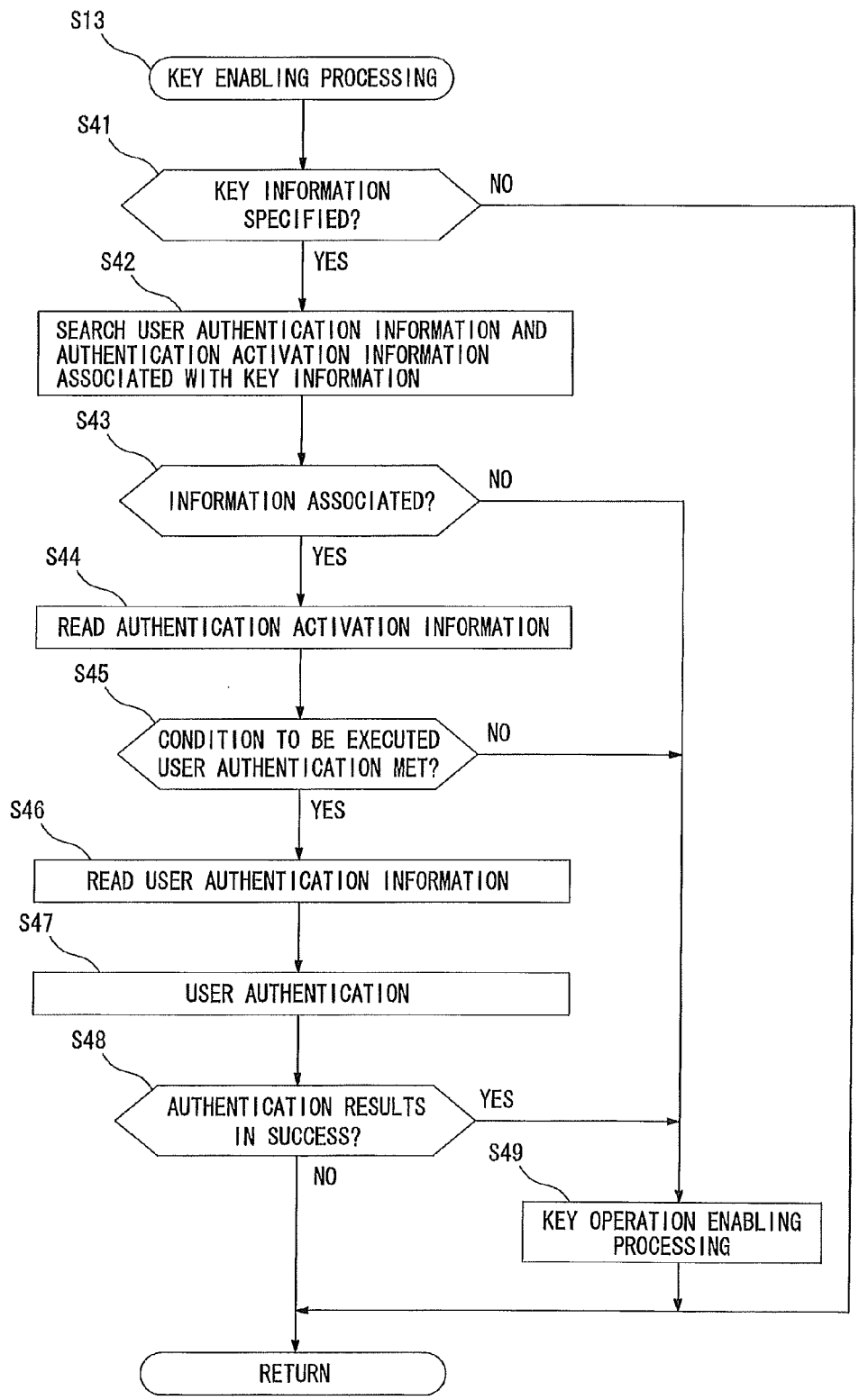
FIG. 16 is a flow diagram for explaining a key enabling processing in detail.

After the key disabling processing (step S12), a key enabling processing (step S13) is started next. FIG. 16 is a flow diagram for explaining the key enabling processing in detail. The CPU 21 determines whether or not the key information 41 is specified in the key operation detection (step S11) at first (step S41). If the key information 41 is not specified, it is assumed that no operation on the operation panel 4 was performed, so the key enabling processing completes here. If the key information 41 is specified, the CPU 21 searches the user authentication information 42 and the authentication activation information 43 associated with the key information 41 (step S42). The CPU 21 then determines whether or not the user authentication information 42 and the authentication activation information 43 are associated with the specified key information 41 (step S43). If no information is associated with the key information 41 (when a result of step S43 is NO), user authentication is not required, so that the key operation of one of the operation keys 13 performed by the user is enabled (step S49). In the step S49, the CPU 21 functions as a key operation enabling part. If information is associated with the key information 41 (when a result of step S43 is YES), the CPU 21 reads the authentication activation information 43 associated with the key information 41 (step S44). The CPU 21 then determines whether or not the condition for executing user authentication defined in the authentication activation information 43 is met (step S45). If the condition for executing user authentication is not met, user authentication is not required, so the key operation of one of the operation keys 13 performed by the user is enabled (step S49). If the condition for executing user authentication is met, the CPU 21 reads the user authentication information 42 associated with the key information 41 (step S46), and executes user authentication process (step S47). Here the CPU 21 comes into operation to function as the authentication part. In the user authentication (step S47), the screen for entering a user name and a password (see FIG. 10B, for example) is displayed on the image display unit 10 of the operation panel 4. The user name and the password entered by the user with the operation panel 4 are determined whether or not which match with information registered in the user authentication information 42. The CPU 21 determines whether or not authentication results in success (step S48). If authentication results in success, the key operation of one of the operation keys 13 performed by the user is enabled (step S49). If authentication results in failure, the key operation of one of the operation keys 13 performed by the user is not enabled. The process completes, and the flow returns to the process shown in the flow diagram of FIG. 13.

After the key enabling processing (step S13), a display update (step S14) follows. In the display update, the CPU 21 updates the display screen of the image display unit 10. For instance, if the key operation is enabled in the key enabling processing (step S13) described above, the display screen is updated to on which the enabled key operation is reflected. If the key operation is not enabled, the key operation is not reflected and the same screen as the one previously shown is displayed. Therefore, when the user operates the operation key 13*a* showing "color" on the initial screen of copy mode as illustrated in FIG. 10A, the display screen of the image display unit 10 is changed to the screen shown in FIG. 10C if the key operation is enabled. If the key operation is not enabled, the display screen of the image display unit 10 returns to the screen illustrated in FIG. 10A.

Figure 17:
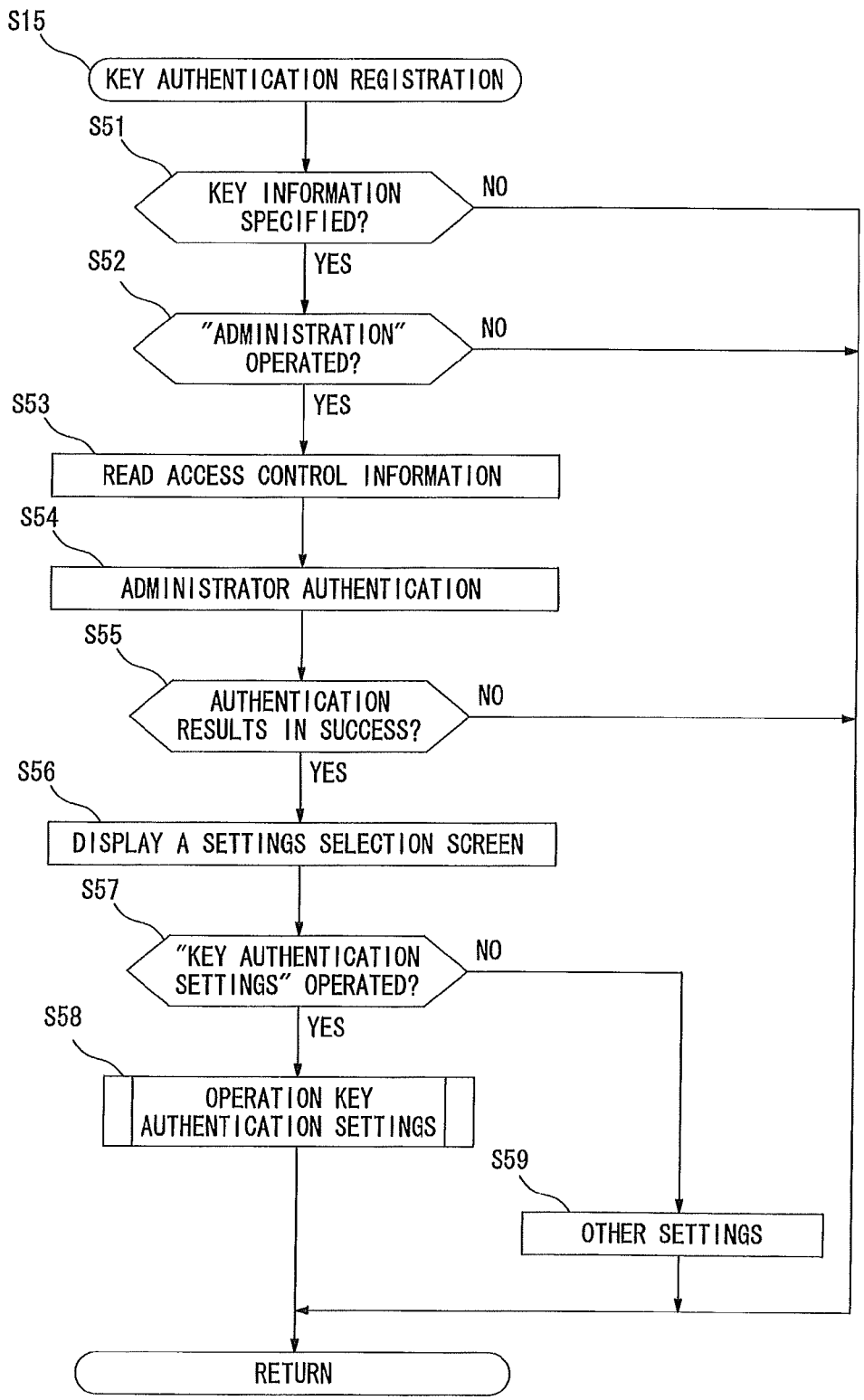
FIG. 17 is a flow diagram for explaining a key authentication registration in detail.

After the display update (step S14), a key authentication registration (step S15) is performed next. FIG. 17 is a flow diagram for explaining the key authentication registration in detail. The CPU 21 determines whether or not the key information 41 is specified in the key operation detection (step S11) at first (step S51). If the key information 41 is not specified, it is assumed that no operation on the operation panel 4 was performed. The key authentication registration completes here. If the key information 41 is specified, whether or not the operation key 13*h* for "administration" (see FIG. 8A) on the operation panel 4 was operated is determined based on the key information 41 (step S52). If it is determined that the operation key 13*h* for "administration" was not operated, the process is not required to be continued, so the key authentication registration completes here. If it is determined that the operation key 13*h* for "administration" was operated, the CPU 21 reads the access control information 49 (step S53). The CPU 21 then executes administrator authentication (step S54), and determines whether or not authentication for administrator results in success (step S55). If authentication for administrator results in failure, the process cannot be continued, so that the key authentication registration completes here. If authentication for administrator results in success, the CPU 21 displays a settings selection screen (see FIG. 8C) on the image display unit 10 of the operation panel 4 (step S56). The CPU 21 then determines whether or not the operation key 13*n* corresponding to "key authentication settings" was operated on the screen (step S57). If the operation keys 13 other than the operation key 13*n* was operated, the process moves on to step S59. Other settings are configured, and the key authentication registration completes. If the operation key 13*n* was operated, the process moves on to step S58, and operation key authentication settings are executed.

Figure 18:
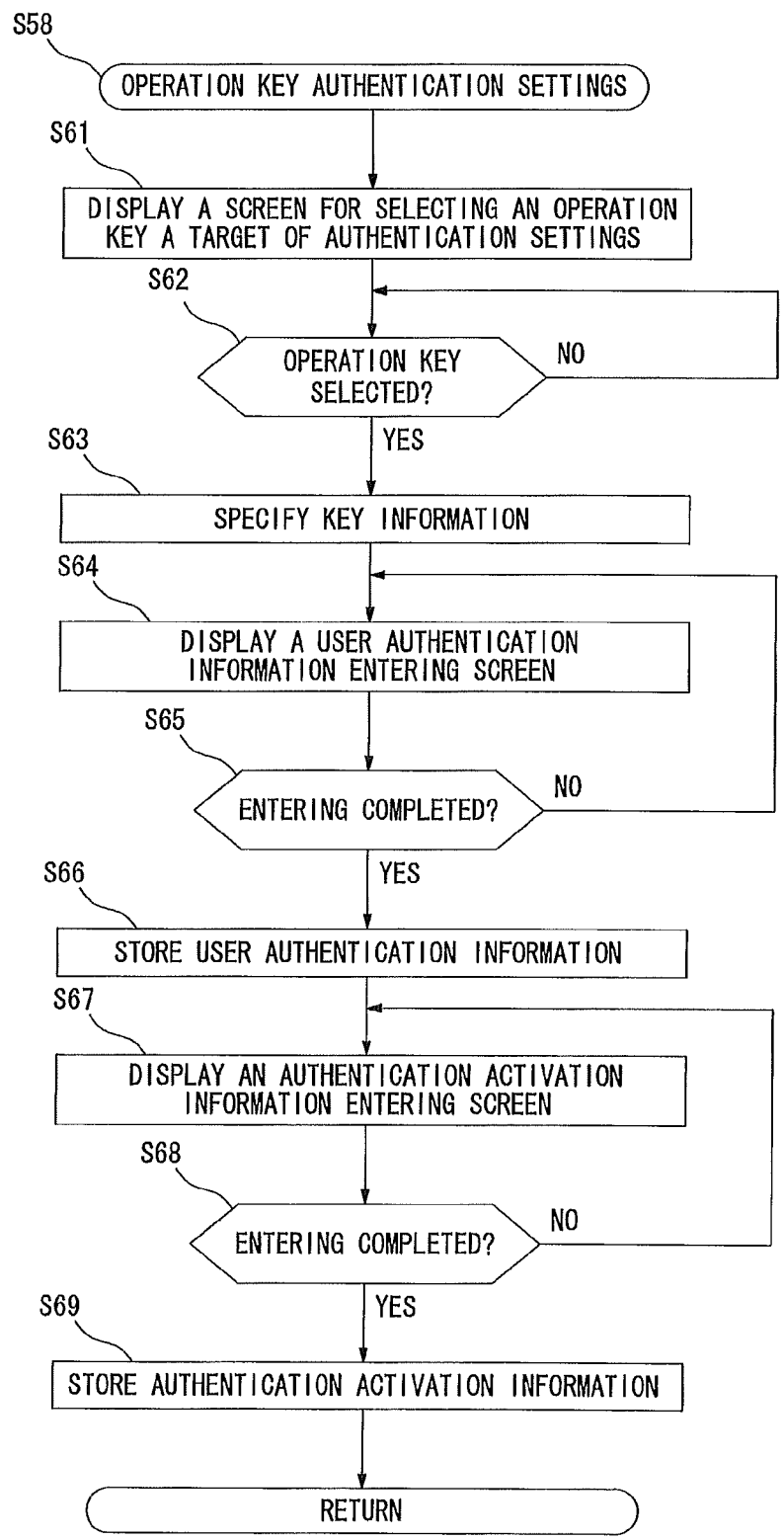
FIG. 18 is a flow diagram for explaining operation key authentication settings in detail.

FIG. 18 is a flow diagram for explaining the operation key authentication settings (step S58) in detail. In this processing, the CPU 21 displays a screen for selecting an operation key a target of authentication settings (see FIG. 9A) on the image display unit 10 (step S61). The CPU 21 stands by until one of the operation keys 13 which is a target of the settings to be selected by the administrator (step S62). When one of the operation keys 13 is selected, the CPU 21 specifies the key information 41 corresponding to the selected one of the operation keys 13 (step S63). The CPU 21 then displays a user authentication information entering screen (see FIG. 9B) on the image display unit 10 (step S64). When entry of the user authentication information 42 by the administrator completes (step S65), the CPU 21 associates the user authentication information 42 entered by the administrator with the key information 41 and stores into the nonvolatile memory 29 (step S66). Next, the CPU 21 displays an authentication activation information entering screen (see FIG. 9C) on the image display unit 10 (step S67). When entry of the authentication activation information 43 by the administrator completes (step S68), the CPU 21 associates the authentication activation information 43 entered by the administrator with the key information 41 and stores into the nonvolatile memory 29 (step S69). The process shown in the flow diagram of FIG. 13 is thus completed.

Figure 19:
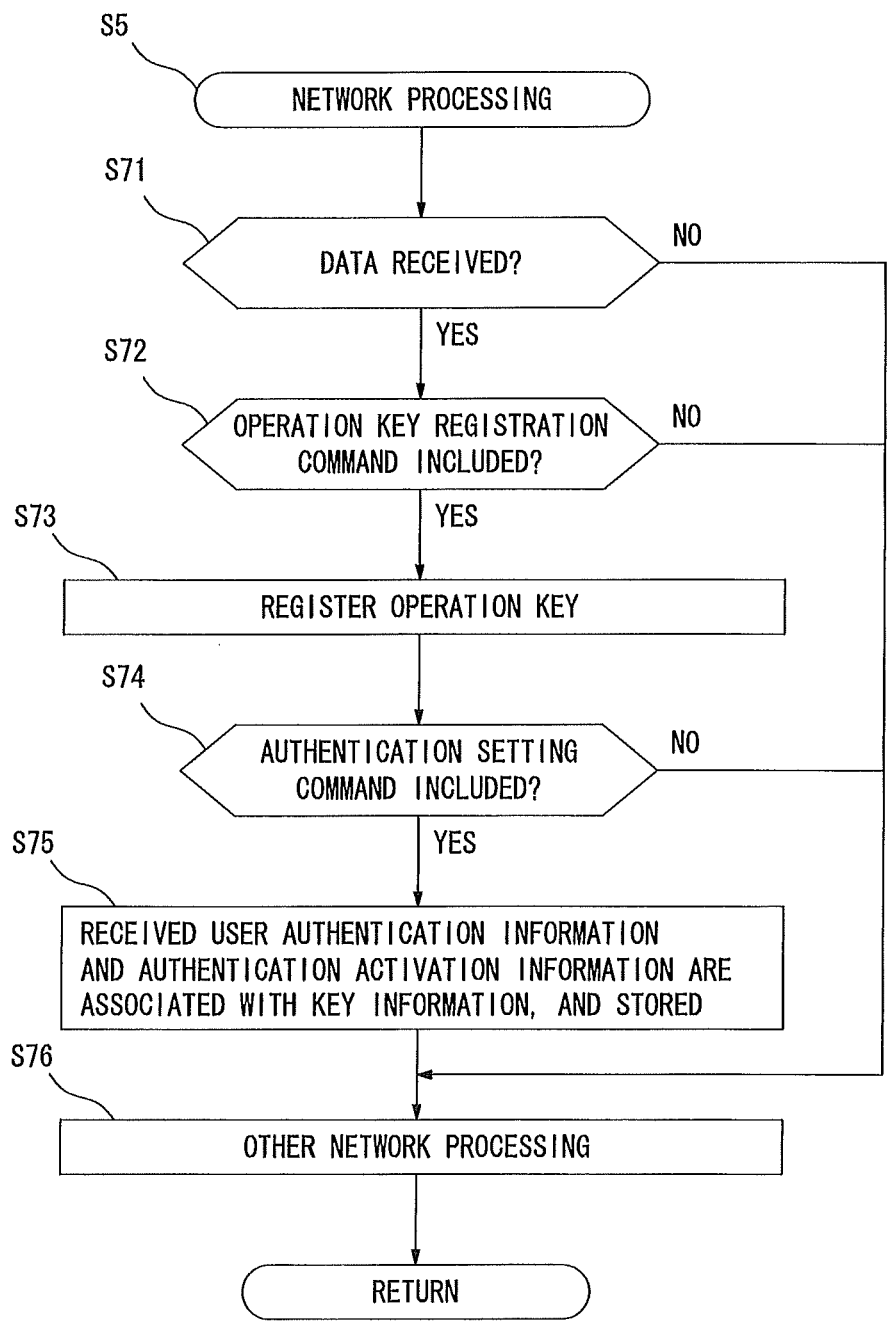
FIG. 19 is a flow diagram for explaining a network processing in detail.
Figure 20A:
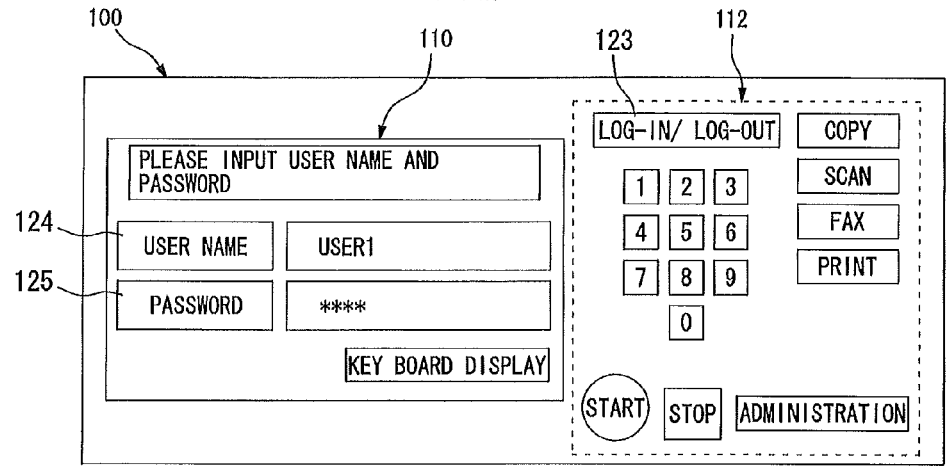
FIGS. 20A, 20B and 20C show an exemplary operation sequence performed on the operation panel by a user when the user performs color copy function in the image processing device conventionally employed, for example.
Figure 20B:
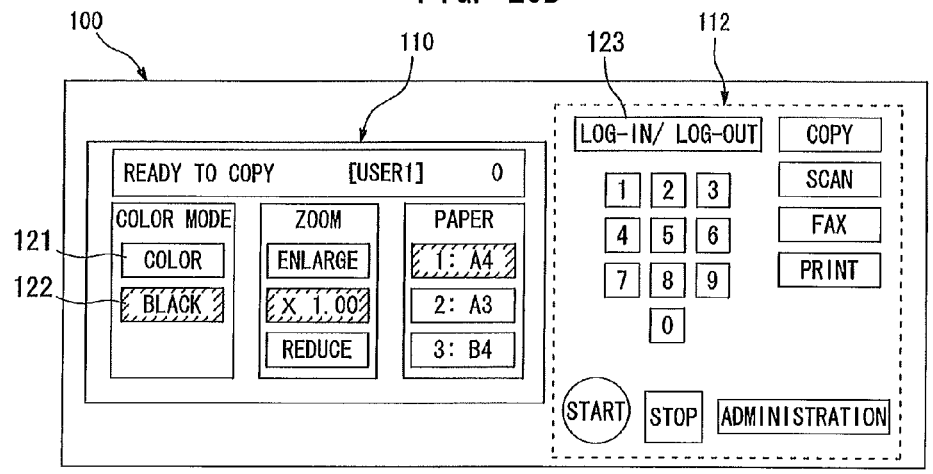
Figure 20C:
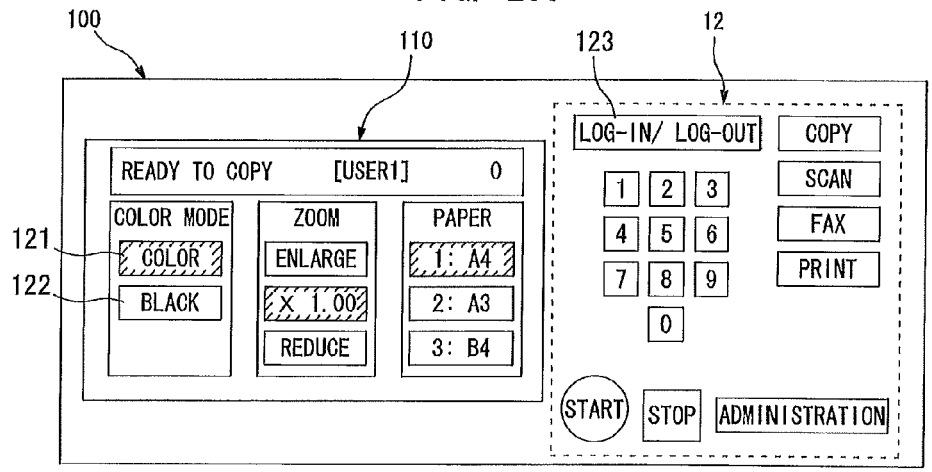
Figure 21A:
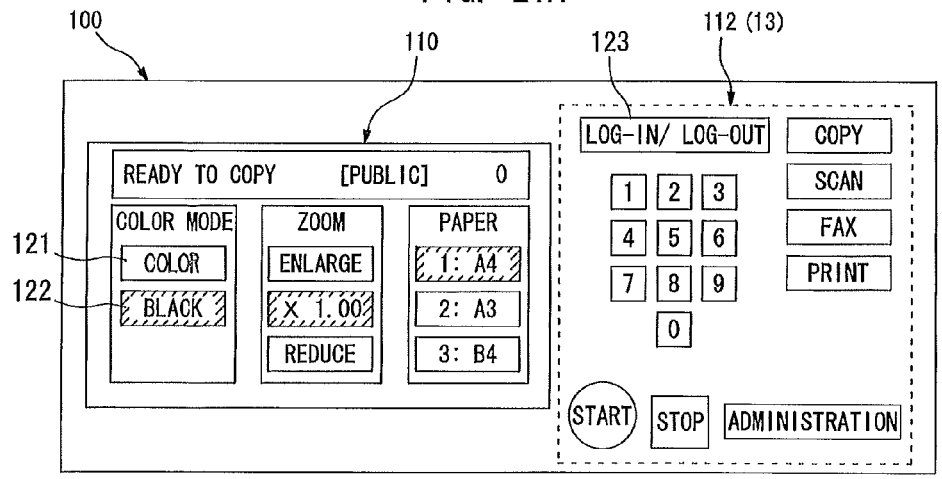
FIGS. 21A, 21B, and 21C show exemplary operation sequence of the user on the operation panel when color copy is performed in the image processing device which sets public mode as an initial state.
Figure 21B:
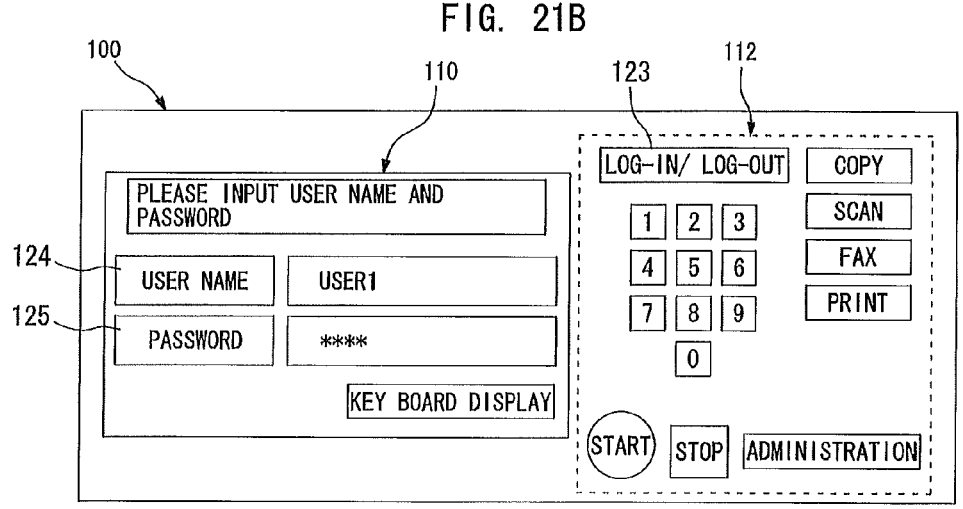
Figure 21C:
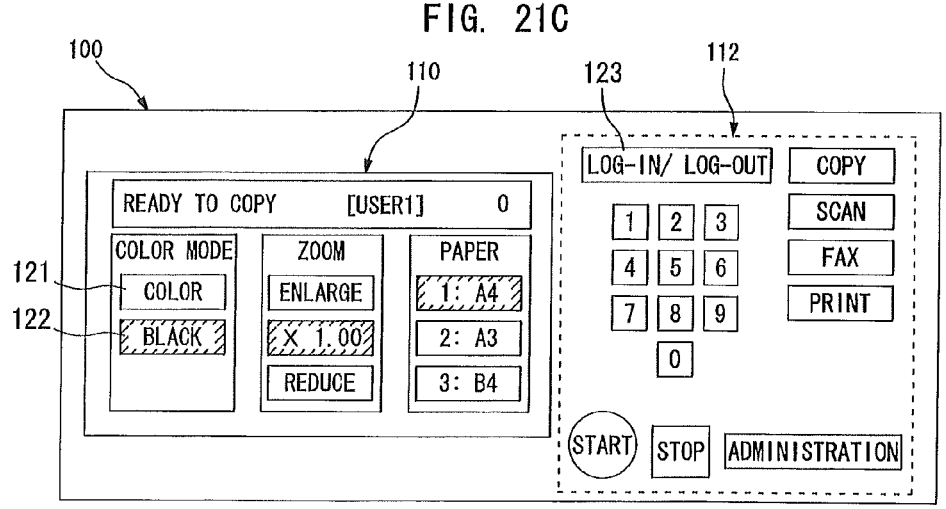

The network processing (step S5) shown in the flow diagram of FIG. 12 is explained next. FIG. 19 is a flow diagram for explaining the network processing (step S58) in detail. The information processing devices 5 and 6 are set up in the network 8. In this case, in the network processing, in order to use functions realized by the application programs P1, P2, P3, P4, P5 and P6 preinstalled in the information processing devices 5 and 6 in the image processing device 1, new operation key is registered into the operation panel 4 based on command or data received from the information processing devices 5 and 6. In this processing, the CPU 21 comes into operation to function as an operation key registration part. The CPU 21 determines whether or not data is received through the network 8 (step S71) at first. If data is not received, the process moves on to step S76. Other network processing is executed, and the process completes here. If data is received through the network 8, the CPU 21 determines whether or not an operation key registration command is included in received data (step S72). If the operation key registration command is not included, the process moves on to step S76. Other network processing is executed, and the process completes here. If the operation key registration command is included, the CPU 21 registers new operation key based on the command (step S73). The CPU 21 allocates new key information 41 to new operation key, and stores into the nonvolatile memory 29. The CPU 21 then determines whether or not an authentication setting command is included in the received data (step S74). If the authentication setting command is not included, the process moves on to step S76. Other network processing is executed, and the process completes here. If the authentication setting command is included, the user authentication information 42 and the authentication activation information 43 received with data at the same time are associated with the key information 41 stored in step S73, and stored into the nonvolatile memory 29 (step S75). Other network processing (step S76) is executed, and the process completes.

As described above, the image processing device 1 in this preferred embodiment has the operation panel 4 on which a plurality of operation keys 13 are arranged. In this image processing device 1, the user authentication information 42 for authenticating a user authorized to use a function corresponding to one of predetermined operation keys 13 and the authentication activation information 43 in which conditions for user authentication to be executed when one of the predetermined operation keys 13 is operated are defined are associated with the key information 41 allocated to each of the operation keys 13, and stored in the nonvolatile memory 29. When the image processing device 1 detects the operation key corresponding to the key information 41 with which the user authentication information 42 and the authentication activation information 43 are associated is operated, the user authentication information 42 and the authentication activation information 43 are read based on the key information 41. If conditions defined in the authentication activation information 43 are met, user authentication process is executed based on the user authentication information 42. If user authentication results in success, the key operation performed by a user is enabled. Therefore, this image processing device 1 executes user authentication only for the key operation requires user authentication. For the key operation which does not require user authentication, each function of the image processing device 1 is able to be used without user authentication. Moreover, even when user authentication is executed, if user authentication results in success, the key operation performed before user authentication is executed is enabled, and reflected in the image processing device 1. As a result, the number of operations on the operation panel 4 performed by a user may be reduced, thereby improving operability of the operation panel 4 in using a function imposed a limitation on use.

While the preferred embodiment of the present invention has been described above, the present invention is not limited to that described above. Various modifications may be applied to the present invention. In the example described in the preferred embodiment as above, the image processing device 1 is stated as a device which has several functions such as a copier function, a scan function, a FAX function, a printer function, and others. However, the image processing device in the present invention may be a device which has at least one of the above functions.

While the invention has been shown and described in detail, the foregoing description is in all aspects illustrative and not restrictive. It is therefore understood that numerous modifications and variations can be devised without departing from the scope of the invention.

What is claimed is:

1. An image processing device having an operation panel on which a plurality of operation keys is arranged, comprising:
    a storage part for storing: key information allocated to each of a plurality of predetermined operation keys of said plurality of operation keys; user authentication information corresponding to the key information and for authenticating a user authorized to use a function corresponding to a predetermined operation key; and authentication activation information corresponding to the key information and which defines conditions for whether user authentication is to be executed when said predetermined operation key is operated;
    a key operation detection part for detecting when any of said plurality of operation keys is operated;
    judgment part for reading said user authentication information and said authentication activation information based on said key information when said key operation detection part detects that said predetermined operation key is operated, and judging whether the status of said image processing device meets the conditions defined in said authentication activation information or not;
    an authentication part for executing user authentication based on said user authentication information if the conditions are met; and
    a key operation activation part for activating a key operation of said predetermined operation key selected by the user when the judging does not meet the conditions, and for activating a key operation of said predetermined operation key, which is selected by the user before user authentication is executed, when user authentication executed by said authentication part results in success.

2. The image processing device according to claim 1, wherein
    said authentication activation information includes information of conditions corresponding to operation status of at least one of said a plurality of operation keys to set conditions about a specific function of the image process device corresponding to said predetermined operation key.

3. The image processing device according to claim 2, further comprising:
    a communication part for transmitting and receiving data for data communication with an information processing device through a network; and
    an operation key registration part for registering at least one of new operation keys to use functions of said information processing device into said operation panel, wherein
    when said at least one of new operation keys to use functions of said information processing device is registered into said operation panel, said operation key registration part allocates said key information to said at least one of new operation keys, associates said user authentication information and said authentication activation information input from said information processing device with said key information, and stores said key information, said user authentication information and said authentication activation information into said storage part.

4. The image processing device according to claim 1, further comprising:
    an operation key registration part for allocating said key information to said at least one of said plurality of operation keys, associating said user authentication information and said authentication activation information input from said operation panel with said key information, and storing said key information, said user authentication information and said authentication activation information into said storage part.

5. The image processing device according to claim 1, further comprising:
    a communication part for transmitting and receiving data for data communication with an information processing device through a network; and
    an operation key registration part for registering at least one of new operation keys to use functions of said information processing device into said operation panel, wherein
    when said at least one of new operation keys to use functions of said information processing device is registered into said operation panel, said operation key registration part allocates said key information to said at least one of new operation keys, associates said user authentication information and said authentication activation information input from said information processing device with said key information, and stores said key information, said user authentication information and said authentication activation information into said storage part.

6. The image processing device according to claim 1, further comprising a set up part for setting a public mode in which all users are permitted to use only some functions of the image processing device, and for setting a login mode in which a user authorized by the authentication part is permitted to use additional functions of the image processing device, wherein
the authentication activation information includes a condition for user authentication information to be executed if the public mode is effective,
the judgment part judges that the condition is met when the public mode is effective, and that the condition is not met when the login mode is effective, and
the key operation enabling part enables a key operation of the predetermined operation key if the condition is not met, and that enables a key operation of the predetermined operation key if user authentication based on the judging that the condition is met, results in success.

7. A user authentication method for authenticating a user who uses an image processing device having an operation panel on which a plurality of operation keys is arranged, comprising the steps of:
(a) storing: key information allocated to each of a plurality of predetermined operation keys of said a plurality of operation keys; user authentication information corresponding to the key information and for authenticating a user authorized to use a function corresponding to a predetermined operation key; and authentication activation information corresponding to the key information and which defines conditions for whether user authentication is to be executed when said predetermined operation key is operated;
(b) detecting when any of said a plurality of operation keys is operated;
(c) reading said user authentication information and said authentication activation information based on said key information when the operation of said predetermined operation key is detected in said step (b), and judging whether the status of said image processing device meets the conditions defined in said authentication activation information or not;
(d) executing user authentication based on said user authentication information if the conditions are met; and
(e) activating a key operation of said predetermined operation key selected by the user when the judging does not meet the conditions, and for activating a key operation of said predetermined operation key, which is selected by the user before user authentication is executed, when user authentication executed in said step (c) results in success.

8. The user authentication method according to claim 7, wherein
said authentication activation information includes information of conditions corresponding to operation status of at least one of said a plurality of operation keys to set conditions about a specific function of the image process device corresponding to said predetermined operation key.

9. The user authentication method according to claim 8, further comprising the steps of:
(f) transmitting and receiving data for data communication with an information processing device through a network; and
(g) registering at least one of new operation keys to use functions of said information processing device into said operation panel, wherein
in said step (g), when said at least one of new operation keys to use functions of said information processing device is registered into said operation panel, said key information is allocated to said at least one of new operation keys, said user authentication information and said authentication activation information input from said information processing device are associated with said key information, and said key information, said user authentication information and said authentication activation information are stored.

10. The user authentication method according to claim 7, wherein
said step (a) includes the steps of: allocating said key information to said at least one of said plurality of operation keys, associating said user authentication information and said authentication activation information input from said operation panel with said key information, and storing said key information, said user authentication information and said authentication activation information.

11. The user authentication method according to claim 7, further comprising the steps of:
(f) transmitting and receiving data for data communication with an information processing device through a network; and
(g) registering at least one of new operation keys to use functions of said information processing device into said operation panel, wherein
in said step (g), when said at least one of new operation keys to use functions of said information processing device is registered into said operation panel, said key information is allocated to said at least one of new operation keys, said user authentication information and said authentication activation information input from said information processing device are associated with said key information, and said key information, said user authentication information and said authentication activation information are stored.

12. A non-transitory computer readable storage medium storing a program executed by a computer of an image processing device having an operation panel on which a plurality of operation keys are arranged for causing said computer to execute processing comprising the steps of:
(a) storing: key information allocated to each of a plurality of predetermined operation keys of said a plurality of operation keys; user authentication information corresponding to the key information and for authenticating a user authorized to use a function corresponding to a predetermined operation key; and authentication activation information corresponding to the key information and which defines conditions for whether user authentication is to be executed when said predetermined operation key is operated;
(b) detecting when any of said a plurality of operation keys is operated;
(c) reading said user authentication information and said authentication activation information based on said key information when the operation of said predetermined operation key is detected in said step (b), and judging whether the status of said image processing device meets the conditions defined in said authentication activation information or not;

(d) executing user authentication based on said user authentication information if the conditions are met; and (e) activating a key operation of said predetermined operation key selected by the user when the judging does not meet the conditions, and for activating a key operation of said predetermined operation key, which is selected by the user before user authentication is executed, when user authentication executed in said step (c) results in success.

13. The non-transitory computer readable storage medium according to claim 12, wherein
said authentication activation information includes information of conditions corresponding to operation status of at least one of said a plurality of operation keys to set conditions about a specific function of the image process device corresponding to said predetermined operation.

14. The non-transitory computer readable storage medium according to claim 13, further comprising the steps of:
(f) transmitting and receiving data for data communication with an information processing device through a network; and
(g) registering at least one of new operation keys to use functions of said information processing device into said operation panel, wherein
in said step (g), when said at least one of new operation keys to use functions of said information processing device is registered into said operation panel, said key information is allocated to said at least one of new operation keys, said user authentication information and said authentication activation information input from said information processing device are associated with said key information, and said key information, said user authentication information and said authentication activation information are stored.

15. The non-transitory computer readable storage medium according to claim 12, wherein
said step (a) includes the steps of: allocating key information to said at least one of said plurality of operation keys, associating said user authentication information and said authentication activation information input from said operation panel with said key information, and storing said key information, said user authentication information and said authentication activation information.

16. The non-transitory computer readable storage medium according to claim 12, further comprising the steps of:
(f) transmitting and receiving data for data communication with an information processing device through a network; and
(g) registering at least one of new operation keys to use functions of said information processing device into said operation panel, wherein
in said step (g), when said at least one of new operation keys to use functions of said information processing device is registered into said operation panel, said key information is allocated to said at least one of new operation keys, said user authentication information and said authentication activation information input from said information processing device are associated with said key information, and said key information, said user authentication information and said authentication activation information are stored.

* * * * *